United States Patent [19]
Doering et al.

[11] Patent Number: 5,249,842
[45] Date of Patent: Oct. 5, 1993

[54] COLLECTOR CART

[75] Inventors: Charles W. Doering, Clarksville, Ind.; James D. Scobee, Louisville, Ky.

[73] Assignee: Brinly-Hardy Co., Ltd., Louisville, Ky.

[21] Appl. No.: 730,054

[22] Filed: Jul. 15, 1991

[51] Int. Cl.$^5$ .............................................. A01D 90/10
[52] U.S. Cl. ..................... 298/6; 298/23 C; 298/23 S
[58] Field of Search ........................ 56/205; 298/5, 6; 23C/23 S, 23 DF

[56] References Cited

U.S. PATENT DOCUMENTS

| | | | |
|---|---|---|---|
| 4,158,279 | 6/1979 | Jackson | 56/202 |
| 4,836,610 | 6/1989 | Doering et al. | 298/6 |
| 4,922,696 | 5/1990 | Burns et al. | 298/6 X |
| 5,080,442 | 1/1992 | Doering et al. | 298/6 |

Primary Examiner—Michael S. Huppert
Assistant Examiner—Janice Krizek
Attorney, Agent, or Firm—Frank C. Leach, Jr.

[57] ABSTRACT

A collector cart includes a body having an open rear end closed by a canopy pivotally connected to the body adjacent their front ends. A tow bar, which has the body pivotally connected thereto, has a support, which has caster wheels connected thereto for support, for the body. The tow bar has a quick hook-up requiring no tools at its forward end for connection to a hitch on a riding lawn mower. When the cart is to be dumped, a first handle is rotated by an operator, who remains on the mower, to initially cause pivoting of a rear portion of a frame of the canopy, which includes a cover on the frame, relative to the body and the remainder of the canopy frame to unlock the rear portion of the canopy from the rear of the body. After unlocking is accomplished, a second handle, which is pivotally mounted on the body and has a portion engaging the tow bar to prevent pivoting of the body, is rotated by the operator to disengage its engaging portion from the tow bar. A gas cylinder, which is pivotally attached to the body and has its piston rod pivotally attached to the tow bar, aids pivoting of the body to a dumping position while the canopy pivots away from the body due to a chain connecting the top front portion of the canopy frame to the mower. The gas cylinder holds the body in the dumping position.

21 Claims, 15 Drawing Sheets

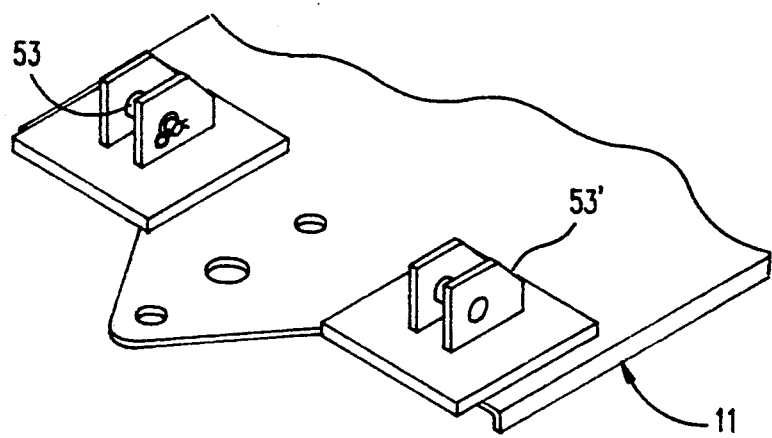
FIG. 11
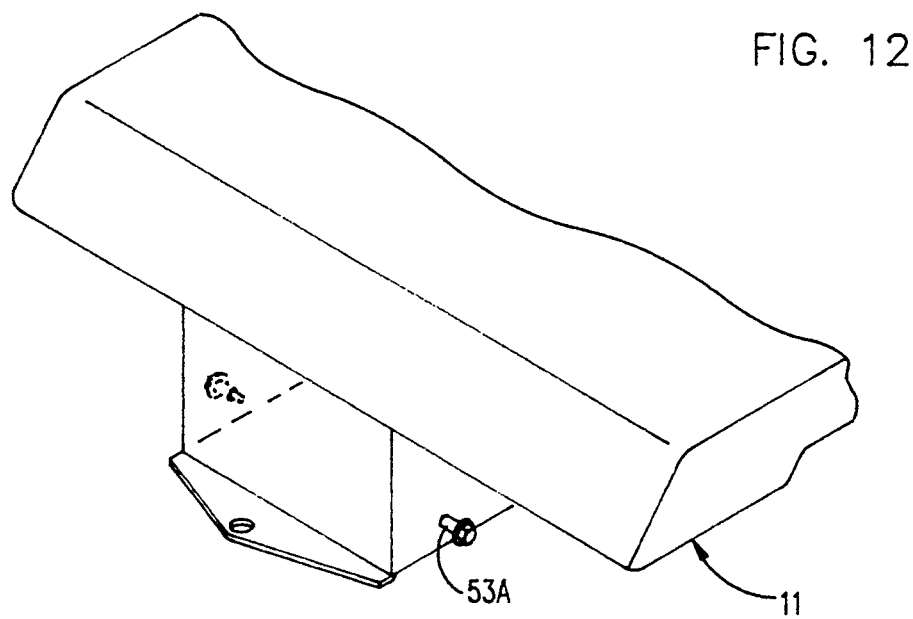
FIG. 12
FIG. 13
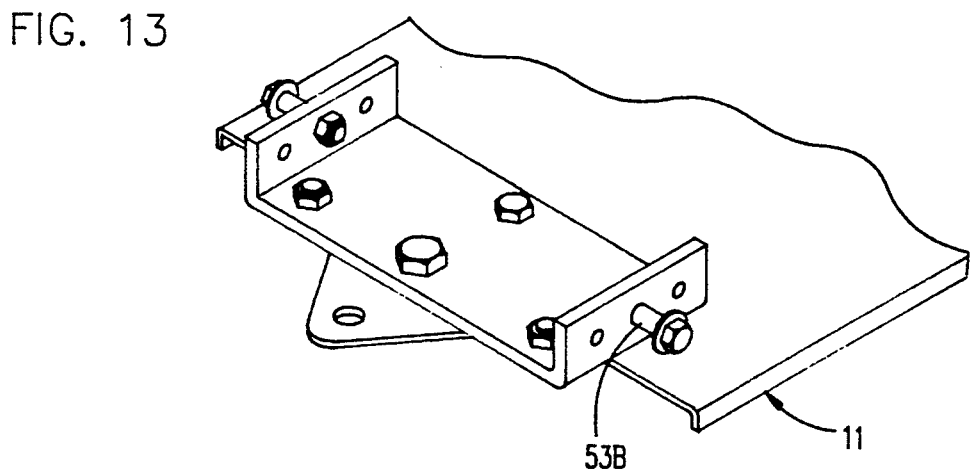

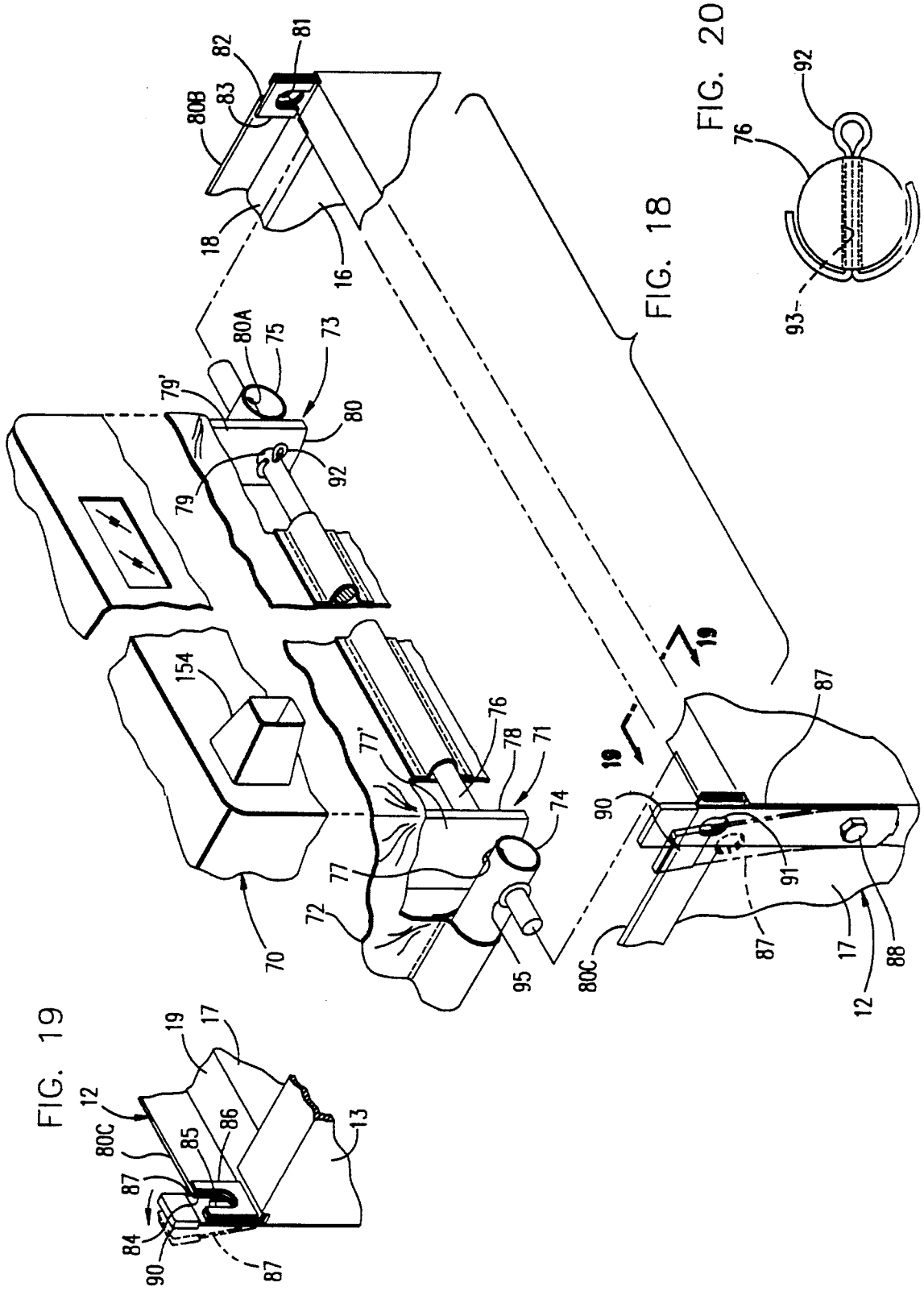

COLLECTOR CART

This invention relates to a cart for collecting debris and, more particularly, to a collector cart having a body pivotally mounted relative to its wheels and a canopy pivotally mounted on the body.

An operator of a riding lawn mower wants to complete cutting of a lawn in the shortest time period. At the same time, the operator of the riding mower normally desires to have all of the debris thrown from the outlet of the mower such as grass clippings, thatch, and leaves, for example, collected so that they do not fall on the cut lawn. Thus, it is desired for the thrown debris to be collected in a suitable collector.

Various types of collectors for collecting debris produced from a riding lawn mower have previously been suggested. These have included collector carts such as the collector carts of U.S. Pat. Nos. 3,522,695 to Musgrave and 4,158,279 to Jackson. The collection of thrown debris from a combine, for example, is disclosed in U.S. Pat. No. 3,351,384 to Huck.

Dumping carts having a pivotally mounted body with a cover that is moved away from the body prior to dumping are illustrated in each of U.S. Pat. Nos. 831,428 to Guiry and 1,024,959 to Wolf. British Pat. No. 1,047,716 to Reeves has a cover that closes the rear open end of a transport container and a portion of the top of the container with the cover pivoting to an open position in response to pivoting of the container to its dumping position.

The aforesaid Jackson patent has a cart towed by a riding lawn mower with the cart including a body, which is pivotally mounted on an axle of wheels of the cart and a canopy pivotally mounted at the front end of the cart. When the debris in the cart is to be dumped, it is necessary for the operator of the riding lawn mower to get off of the lawn mower, unlock the rear of the canopy from the rear of the body, and then push the rear end of the canopy upwardly to cause the canopy to pivot relative to the body with the body pivoting about the axle of the cart wheels in response to the canopy being pivoted.

Therefore, the collector cart of the aforesaid Jackson patent has the problem of the engine being turned off, either manually or automatically, when the operator gets off the seat. Additionally, the body of the cart of the aforesaid Jackson patent has a slanting rear wall, which engages the ground during dumping to support the body, so that all of the debris within the canopy and the body cannot fall therefrom by gravity. Accordingly, it is necessary for the operator to have to clean out a portion of the debris within the collector cart body when dumping the debris from the cart of the aforesaid Jackson patent.

Another problem with the collector cart of the aforesaid Jackson patent is that the debris is compressed within the canopy and the cart body so as to bulge against the canopy. This produces a substantial resistance to the normal lifting forces to raise the canopy from its closed position.

A further problem with the collector cart of the aforesaid Jackson patent is that the wheels are mounted on the ends of an axle and must track the mower. Thus, it is sometimes difficult to back up the collector cart of the aforesaid Jackson patent without jackknifing. Since it is necessary to normally back up the cart to where the debris is to be dumped, the fixed tracking arrangement of the cart wheels presents a problem for the operator of the riding mower to correctly maneuver the cart in response to motions of the mower.

One satisfactory solution to the foregoing problems is the collector cart of U.S. Pat. No. 4,836,610 to Charles W. Doering et al. Two other satisfactory solutions to the foregoing problems are shown and described in the copending patent application of Charles W. Doering et al, Ser. No. 07/533,020, filed Jun. 4, 1990, now U.S. Pat. No. 5,080,442.

The collector cart of the present invention is an improvement of the carts of the aforesaid Doering et al patent and the aforesaid Doering et al application. The present invention is more economical to produce and reduces the amount of effort by the operator to move the body of the cart to its dumping position. The present invention also eliminates any requirement for holding the canopy and the body in the dumping position. The present invention also has a unique arrangement for adjustably mounting on the forward end of the tow bar for connection to various hitches on various riding lawn mowers.

The collector cart of the present invention satisfactorily solves the foregoing problems through providing a collector cart for use with a riding lawn mower in which it is not necessary for the operator to get off of the riding lawn mower when it is desired to dump debris from the collector cart. Therefore, the engine does not have to be turned off.

The collector cart of the present invention also eliminates the debris from providing a resistance to normal lifting of the canopy when it is to be opened. This is accomplished through pivoting the rear of the canopy frame relative to the remainder of the canopy frame before any pivoting occurs between the canopy frame and the cart body. This pivoting of the rear of the canopy frame relative to the remainder of the canopy frame also disconnects a locking arrangement for locking the rear of the canopy frame to the rear of the cart body so that the canopy is locked when in use but still unlocked when desired without the operator having to get off of the riding lawn mower.

The collector cart of the present invention has its canopy not only designed to reduce the friction of a heavily loaded cart in the same manner as one of the two embodiments of the aforesaid Doering et al application but also has an arrangement for adjusting the tension on the cover of the canopy. This further aids in allowing the debris to fall more easily from the canopy through the bottom.

The collector cart of the present invention also is capable of dumping its entire contents. This is accomplished through forming the cart body with an open rear end, which is closed by the canopy. Accordingly, the cart body has no rear wall to block the flow of debris by gravity from the cart body when the cart is in its dumping position.

The movement of the collector cart to its dumping position is accomplished through the operator, while seated on the riding lawn mower, initially grasping a release handle accessible from the front of the cart body to unlock the canopy from the cart body. After movement of the release handle is completed, a lock handle is grasped by the operator while seated on the riding lawn mower to enable release of the cart body from the tow bar so that the body can be free to pivot. The operator causes pivoting of the cart body to its dumping position by exerting a force on the lock handle with the cart body being aided in movement to its dumping position by a gas cylinder, which is pivotally connected to the body and to the tow bar. The canopy responds to the pivoting of the cart body through having its upper front end connected to the riding lawn mower preferably by a chain.

The collector cart of the present invention overcomes the tracking problem of the collector cart of the aforesaid Jackson patent by utilizing caster wheels. This enables the collector cart to be moved in a rearward direction in response to the riding lawn mower without substantial maneuvering by the operator of the riding lawn mower while still being capable of tracking the mower in the forward direction.

An object of this invention is to provide a collector cart for collecting debris.

Another object of this invention is to provide a collector cart having two actuating mechanisms.

A further object of this invention is to provide a unique mounting arrangement for a canopy of a cart body.

Still another object of this invention is to provide a canopy having its tension adjustable.

A still further object of this invention is to provide a canopy of a cart body that can be quickly removed without any tools to enable use of the cart body as a utility hauling cart.

Yet another object of this invention is to provide a hitch connecting arrangement on the front end of the tow bar of the collector cart for use with a plurality of different hitch arrangements on the pulling means for the collector cart.

Other objects of this invention will be readily perceived from the following description, claims, and drawings.

The attached drawings illustrate a preferred embodiment of the invention, in which:

FIG. 11 is a fragmentary perspective view of a portion of a riding lawn mower having lower hitch pins used with a category "O" three-point hitch;

FIG. 12 is a fragmentary perspective view of a portion of a riding lawn mower having hitch shoulder bolts;

FIG. 13 is a fragmentary perspective view of a portion of a riding lawn mower having another arrangement of a hitch with hitch shoulder bolts;

FIG. 18 is an exploded fragmentary perspective view of a pivotal mounting arrangement for pivotally mounting the front of the canopy frame on the front of the cart body;

FIG. 19 is an enlarged fragmentary perspective view of a portion of the mounting arrangement for the canopy frame of FIG. 18 and taken along line 19—19 of FIG. 18;

FIG. 20 is an end elevational view of a rod for mounting the canopy frame on the cart body and showing a cotter pin extending through the rod;

FIG. 25 is a fragmentary sectional view of a ball socket and ball stud showing the connection therebetween and taken along line 25—25 of FIG. 7.

Figure 1B:
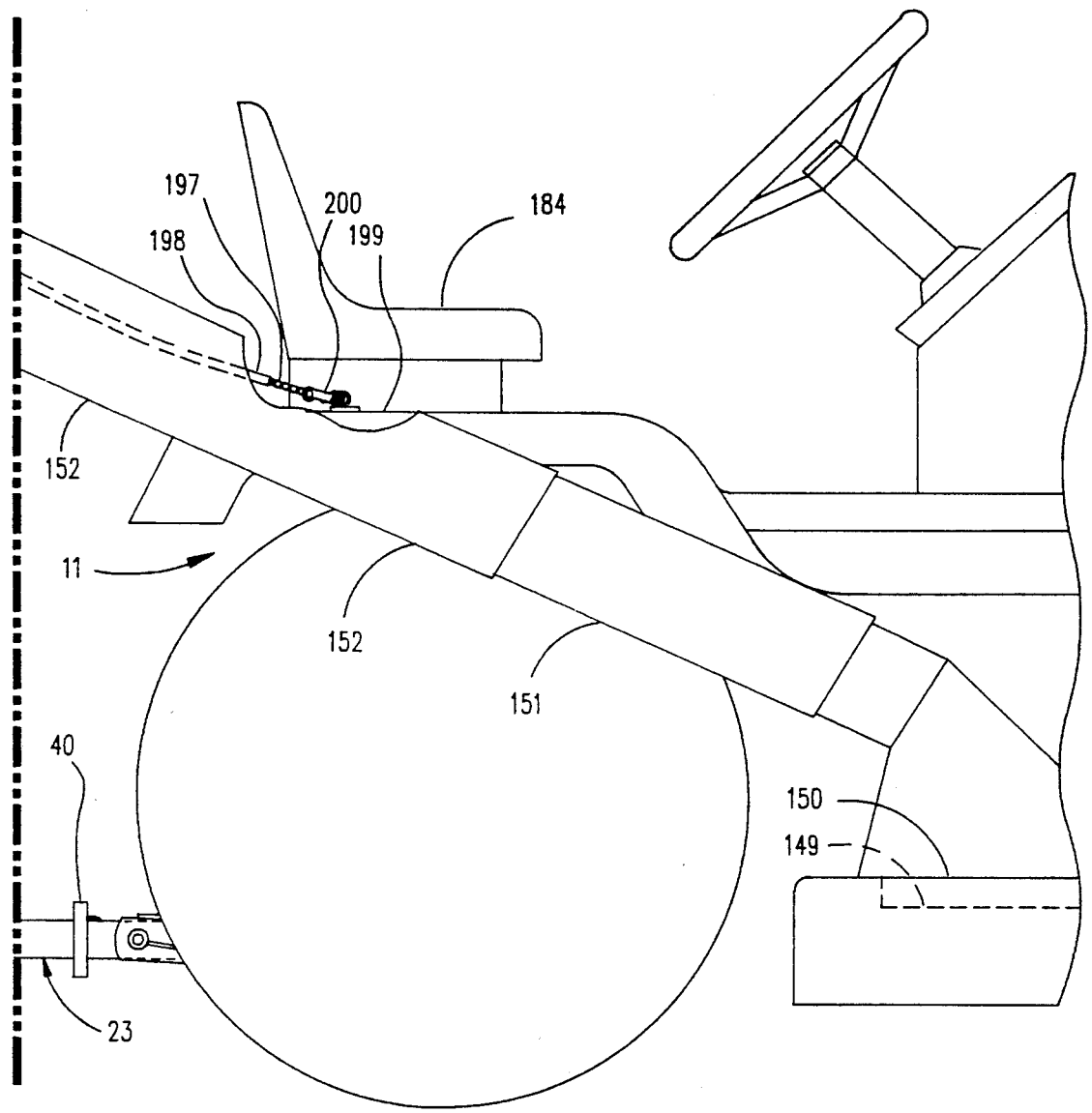
FIGS. 1A and 1B are a right side elevational view of the cart of the present invention attached to a riding lawn mower and showing two actuating mechanisms accessible from the front of the cart with the cart in its towed position in solid lines and the initial motion of one of the two actuating mechanisms to unlock the frame of the canopy from the cart body in phantom lines.
Figure 1:
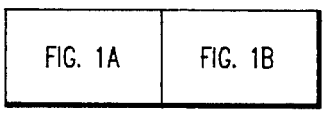
FIG. 1 is a block diagram showing the relation of FIGS. 1A and 1B.
Figure 1A:
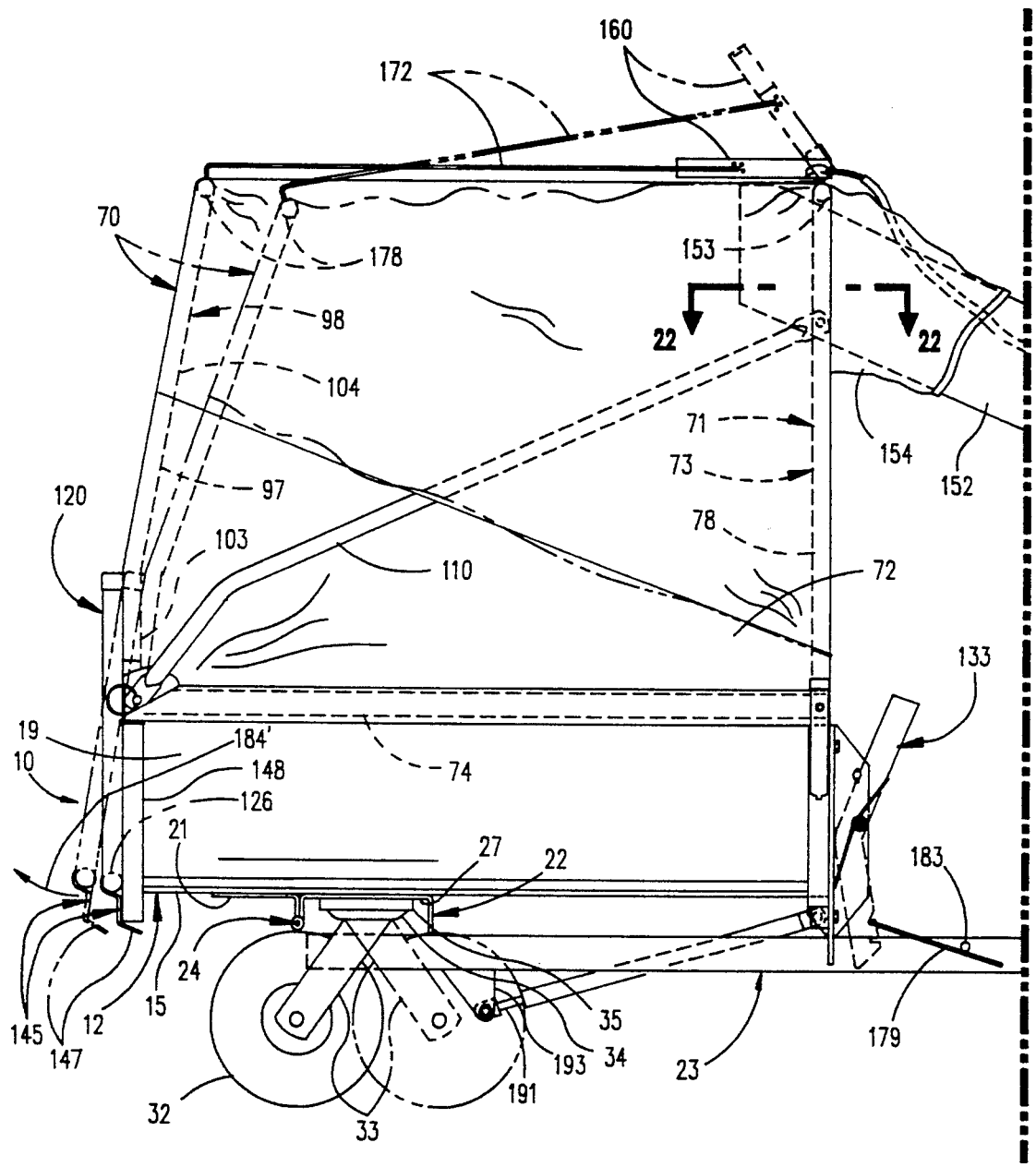
Figure 4:
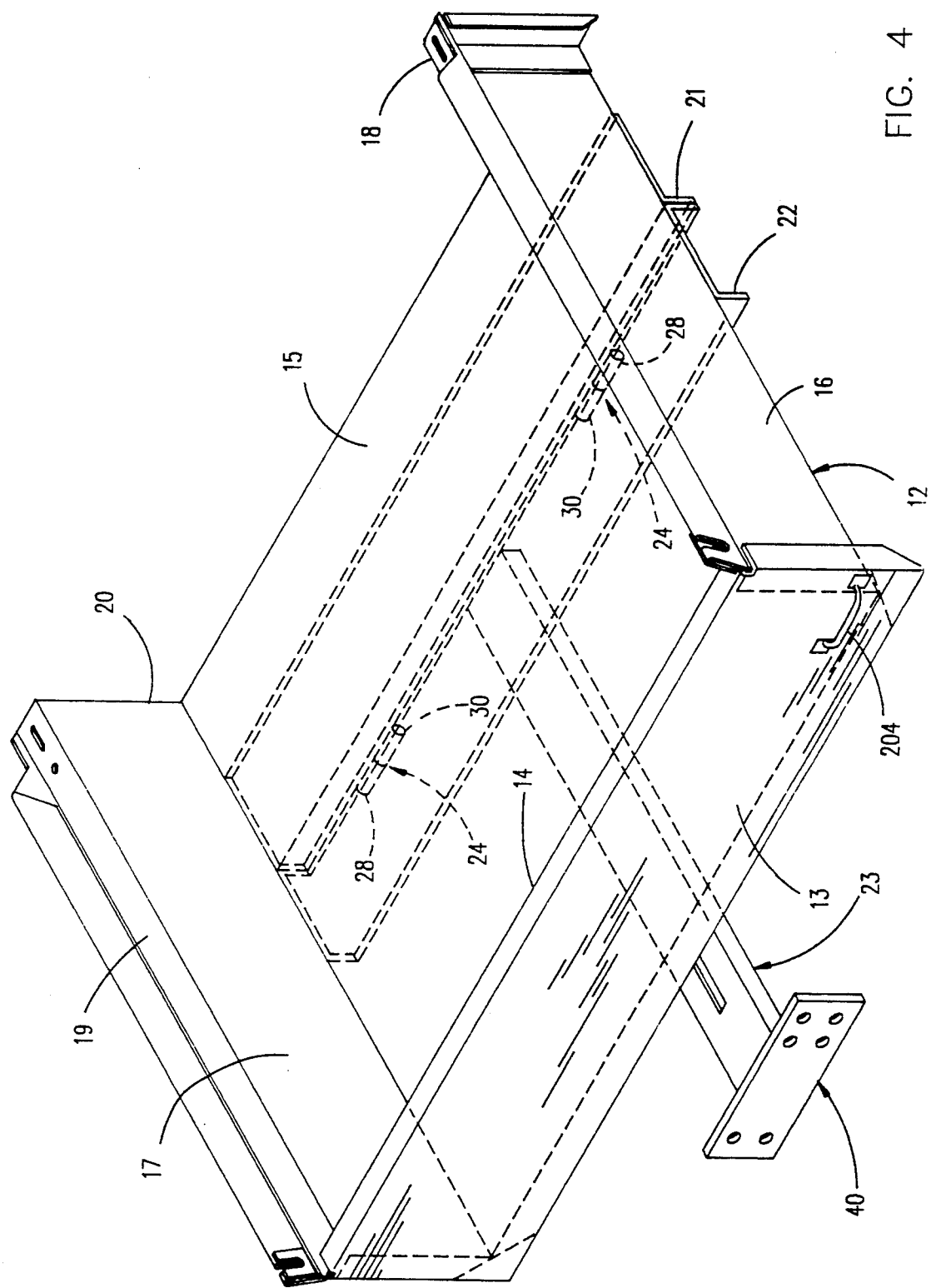
FIG. 4 is a front perspective view of the cart body of FIG. 1.

Referring to the drawings and particularly FIG. 1A, there is shown a collector cart 10 for collecting thrown debris such as grass clippings and leaves, for example, from a riding lawn mower 11 (see FIG. 1B), for example, which tows or pulls the collector cart 10 (see FIG. 1A) behind it. The collector cart 10 includes a body 12 having a front wall 13 (see FIG. 4) with a top flange 14 extending rearwardly therefrom. A bottom wall 15 extends rearwardly from the front wall 13 and has substantially parallel side walls 16 and 17 extending upwardly therefrom and substantially perpendicular thereto.

The side wall 16 has a top flange 18 extending outwardly therefrom and substantially perpendicular thereto, and the side wall 17 has atop flange 19 extending outwardly therefrom and substantially perpendicular thereto. The body 12 has an open rear end 20 between the side walls 16 and 17.

Figure 7:
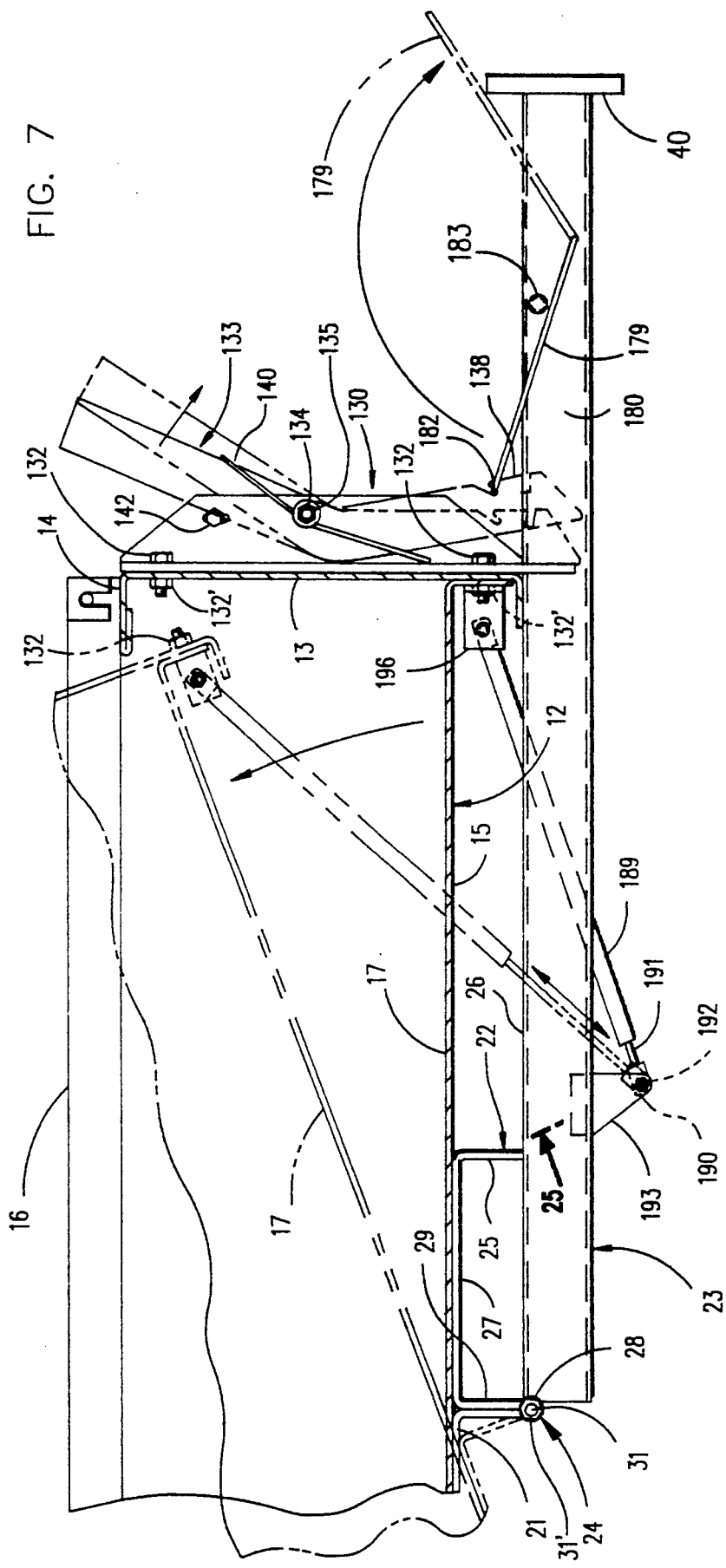
FIG. 7 is an enlarged fragmentary side elevational view of the tow bar and a portion of the cart body with the wheels omitted.

The bottom wall 15 (see FIG. 1A) of the body 12 has an L-shaped hinge bracket 21 welded thereto and pivotally connected to an inverted U-shaped support 22, which is secured to a tow bar or draw bar 23 by welding, for example, by pivotal connecting means 24 (see FIG. 7). The tow bar 23 has a leg 25 of the inverted U-shaped support 22 welded to its top wall 26. The inverted U-shaped support 22 has its base 27 engaging the bottom wall 15 of the body 12 to support the body 12 when the body 12 is in its tow position.

The pivotal connecting means 24 includes a pair of hollow tubes 28, which are welded to bottom surface of a leg 29 of the inverted U-shaped support 22, and a pair of hollow tubes 30 (see FIG. 4) welded to bottom surface of the L-shaped hinge bracket 21. Each of the hollow tubes 30 is disposed adjacent one of the hollow tubes 28 and interior thereof. Each of the adjacent hollow tubes 28 and 30 has a pivot bolt 31 (see FIG. 7) extending therethrough. Each of the pivot bolts 31 has a lock nut 31' on its threaded end to retain it within the adjacent hollow tubes 28 (see FIG. 4) and 30. Thus, the pivotal connecting means 24 includes two separate pivotal connections.

The base 27 (see FIG. 1A) of the inverted U-shaped support 22 has a pair of caster wheels 32 supported thereby to enable the caster wheels 32 to support the tow bar 23 and the cart body 12. Each of the caster wheels 32 is rotatably supported by a pair of legs 33 extending from a swivel plate 34, which is rotatably supported on a mounting plate 35 secured to the base 27 of the inverted U-shaped support 22 on the tow bar 23.

Accordingly, the tow bar 23 and the caster wheels 32 are integral with each other. The body 12 is pivotally mounted with respect to the caster wheels 32 and the tow bar 23 through the body 12 being pivotally mounted on the tow bar 23 by the pivotal connecting means 24.

Figure 9:
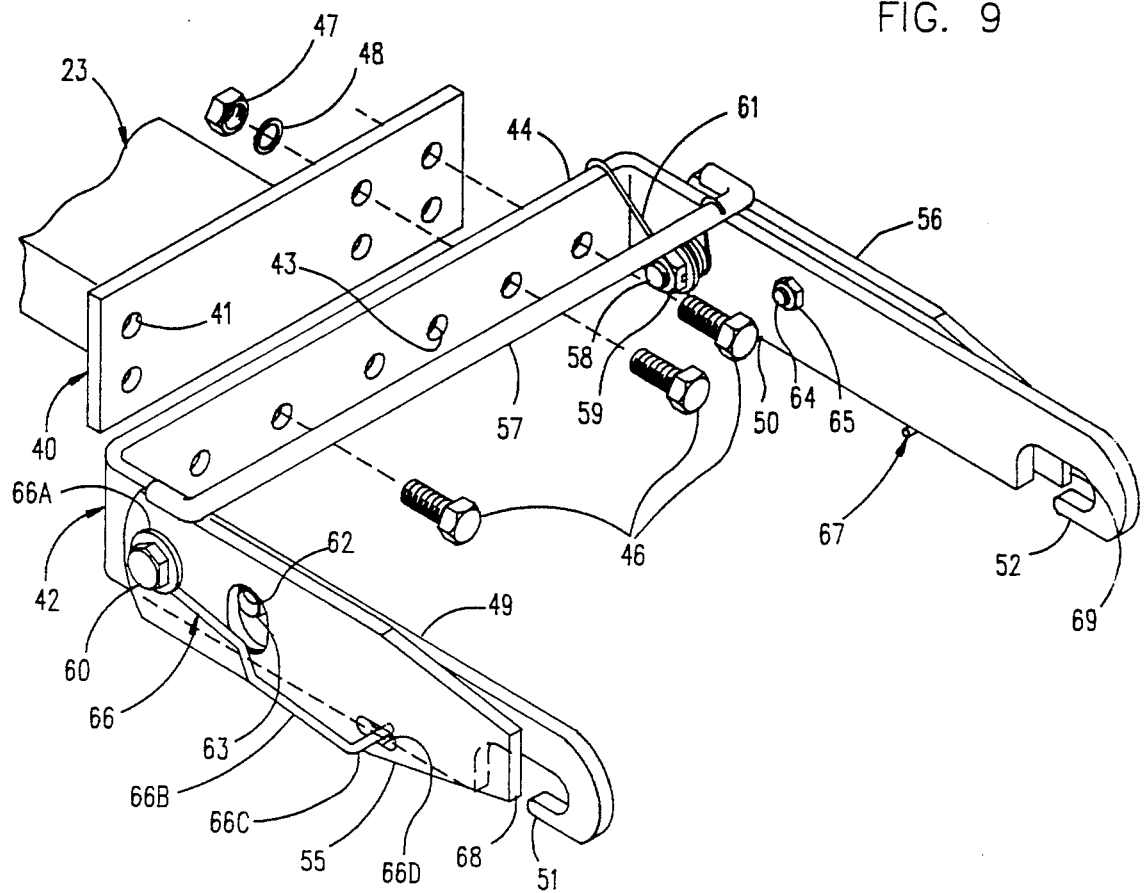
FIG. 9 is a perspective view of a mounting arrangement for connecting the tow bar to a hitch of the riding lawn mower.

The tow bar 23 has a rectangular shaped mounting plate 40 (see FIG. 9) secured to its forward end by suitable means such as welding, for example. The rectangular shaped mounting plate 40 has six holes 41 therein to enable a U-shaped hitch bail 42 to be adjustably mounted thereon. The U-shaped hitch bail 42 has a plurality of holes 43 in its base 44 to allow both lateral and vertical adjustment of the U-shaped hitch bail 42 with respect to the tow bar 23 in accordance with the configuration of the connecting structure such as a hitch, for example, on the riding lawn mower 11 (see FIG. 1B). The base 44 (see FIG. 9) of the U-shaped hitch bail 42 is secured to the mounting plate 40 by bolts 46 extending through three of the holes 43 in the base 44 of the U-shaped hitch bail 42 and three of the holes 41 in the mounting plate 40 and nuts 47 with washers 48 between the nuts 47 and the mounting plate 40.

Substantially parallel legs 49 and 50 of the U-shaped hitch bail 42 have hook ends 51 and 52, respectively. Each of the hook ends 51 and 52 is utilized to engage one of pins 53 (see FIG. 10) supported in ears 53' (see FIG. 11) on the riding lawn mower 11.

Instead of the riding lawn mower 11 having the pins 53, the riding lawn mower 11 may have shoulder bolts 53A as shown in FIG. 12 or shoulder bolts 53B as shown in FIG. 13 for engagement by the hook ends 51 (see FIG. 9) and 52. It should be understood that the hook ends 51 and 52 of the legs 49 and 50, respectively, of the U-shaped hitch bail 42 are capable of cooperating with any type of cylindrical surface of a hitch on the riding lawn mower 11 (see FIG. 1B).

The leg 49 (see FIG. 9) of the U-shaped hitch bail 42 has a locking bar 55 on its exterior, and the leg 50 of the U-shaped hitch bail 42 has a locking bar 56 on its exterior. A lift rod 57 is welded to the tops of the locking bars 55 and 56 to form a unitary assembly.

The locking bar 56 is pivotally mounted on the leg 50 by a bolt 58 and a lock nut 59. The locking bar 55 is pivotally supported on the leg 49 of the U-shaped hitch bail 42 by a bolt 60 and a lock nut (not shown) in the same manner as the locking bar 56 is pivotally supported on the leg 50.

A torsion spring 61 is wrapped around the bolt 58 and has one end engaging the lift rod 57 and its other end engaging the base 44 of the U-shaped hitch bail 42. The torsion spring 61 continuously urges the lift rod 57 against the top surfaces of the legs 49 and 50 of the U-shaped hitch bail 42.

The locking bar 55 has an elongated slot 62 through which a bolt 63 extends for cooperation with a nut (not shown) on the opposite side of the leg 49 of the U-shaped hitch bail 42. The locking bar 56 has a similar bolt 64 extending through an elongated slot (not shown), which is the same as the elongated slot 62 in the locking bar 55, in the locking bar 56 and cooperating with a nut 65. Thus, these bolt and nut arrangements limit the amount of pivoting of the locking bars 55 and 56 relative to the legs 49 and 50, respectively, of the U-shaped hitch bail 42.

A spring clip 66 is rotatably supported on the bolt 60 by a looped end passing around the bolt 60. A washer 66A is disposed between the head of the bolt 60 and the locking bar 55 to insure that the looped end of the spring clip 66 is retained on the bolt 60. The spring clip 66 has a gripping portion 66B spaced from the locking bar 55 to permit gripping thereof.

The spring clip 66 terminates in a portion 66C, which is substantially perpendicular to the gripping portion 66B, extending through an elongated slot 66D in the locking bar 55. The portion 66C of the spring clip 66 extends beneath the bottom surface of the leg 49 to lock the locking bar 55 against counterclockwise pivoting about the bolt 60.

The locking bar 56 has a spring clip 67 similarly mounted on the bolt 58. This locks the locking bar 56 against counterclockwise pivoting about the bolt 58.

Figure 10:
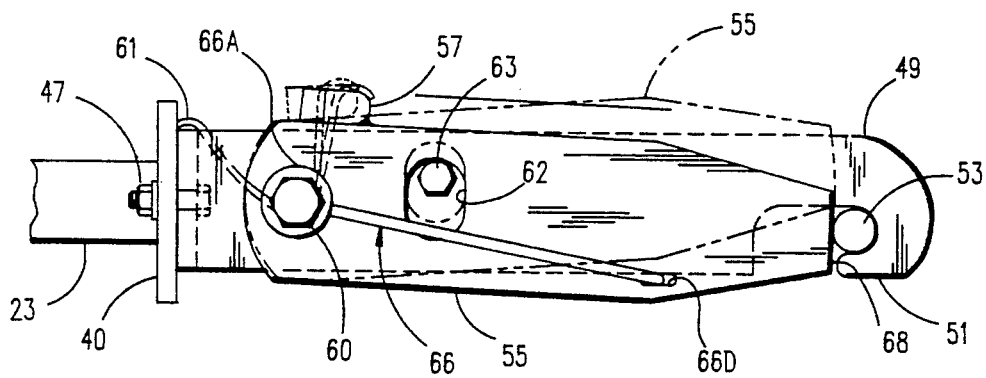
FIG. 10 is a side elevational view of the mounting arrangement of FIG. 9 for connecting the tow bar to a hitch of the riding lawn mower.

Accordingly, when the cart 10 (see FIG. 1A) is to be latched to the pins 53 (see FIG. 11) or the shoulder bolts 53A (see FIG. 12) or the shoulder bolts 53B (see FIG. 13) on the riding lawn mower 11, each of the spring clips 66 (see FIG. 9) and 67 is withdrawn from its locking engagement with the legs 49 and 50, respectively, of the U-shaped hitch bail 42 and the lift rod 57 is raised upwardly to cause pivoting of the locking bars 55 and 56 to the phantom line position of FIG. 10. In this position, the hook ends 51 and 52 (see FIG. 9) of the legs 49 and 50, respectively, of the U-shaped hitch bail 42 can be disposed over the pins 53 (see FIG. 11) or the shoulder bolts 53A (see FIG. 12) or the shoulder bolts 53B (see FIG. 13) on the riding lawn mower 11 as shown in FIG. 10 for one of the pins 53. Then, release of the lift rod 57 allows the torsion spring 61 to return the locking bars 55 and 56 (see FIG. 9) to the solid line position of FIG. 10 and each of the spring clips 66 (see FIG. 9) and 67 is returned to its locking engagement with the legs 49 and 50, respectively, of the U-shaped hitch bail 42. This results in an end surface 68 of the locking bar 55 and an end surface 69 of the locking bar 56 holding each of the two pins 53 (see FIG. 10) within the hook ends 51 (see FIG. 9) and 52 of the legs 49 and 50, respectively, of the U-shaped hitch bail 42 as shown in FIG. 10 for the end surface 68 of the locking bar 55.

It should be understood that the tow bar 23 (see FIG. 1B) is disconnected from the riding lawn mower 11 by lifting upwardly on the lift rod 57 (see FIG. 9) after the spring clips 66 and 67 are removed from their locking engagement so that the locking bars 55 and 56 move to the phantom line position of FIG. 10. This enables withdrawal of the pins 53 from the hook edges 51 and 52 (see FIG. 9) of the legs 49 and 50, respectively, of the U-shaped hitch bail 42.

The collector cart 10 (see FIG. 1A) also includes a canopy 70 mounted solely for pivotal movement with respect to the body 12 and enclosing the open top of the body 12 and closing the open rear end 20 (see FIG. 4) of the body 12 to form an enclosed chamber therebetween. The canopy 70 (see FIG. 1A) includes a frame 71 and a cover material 72 supported by the frame 71.

The frame 71 includes a front upper frame 73, which is U-shaped and constitutes a front frame support, pivotally connected to the front ends of a pair of substantially parallel side tubes or elements 74 and 75 (see FIG. 18). A rod 76 extends through aligned openings (not shown) in the side tube 74, an opening 77 in a flattened bottom end 77' of a substantially vertical leg 78 of the front upper frame 73, an opening 79 in a flattened bottom end 79' of a substantially vertical leg 80 of the front upper frame 73, and aligned openings (one shown at 80A) in the side tube 75.

The top horizontal flange 18 of the side wall 16 of the body 12 has a side flange 80B extending upwardly therefrom and outwardly at an angle of 10° to the vertical. The top horizontal flange 19 (see FIG. 19) of the side wall 17 of the body 12 has a side flange 80C extending upwardly therefrom and outwardly at an angle of 10° to the vertical. By having the side flanges 80B (see FIG. 18) and 80C at an angle of 10° to the vertical, the side flanges 80B and 80C function as guides for the side tubes 74 and 75 of the frame 71 of the canopy 70 so that they can be readily received to rest on the top horizontal flange 18 of the side wall 16 of the body 12 and the top horizontal flange 19 (see FIG. 19) of the side wall 17 of the body 12.

One end of the rod 76 (see FIG. 18) extends through an opening 81, which is formed by an upwardly facing slot 82 in the side flange 80B of the body 12 and a downwardly facing U-shaped reinforcing tab 83. The tab 83 is secured to the inner surface of the side flange 80B of the body 12 by suitable means such as welding, for example.

The other end of the rod 76 is disposed within an upwardly facing U-shaped slot 84 (see FIG. 19) in the side flange 80C of the body 12 and an upwardly facing slot 85 in an upwardly facing U-shaped reinforcing tab 86. The U-shaped tab 86 is secured to the side flange 80C of the body 12 by suitable means such as welding, for example.

A leaf spring 87 (see FIG. 18) is attached to the side wall 17 by a bolt 88 and a nut (not shown). The upper end of the leaf spring 87 has an enlarged vinyl cap 90, which is disposed over the slot 84 (see FIG. 19) in the side flange 80C of the body 12 and the slot 85 in the U-shaped reinforcing tab 86 when the leaf spring 87 is in its solid line position. As shown in FIG. 18, the leaf spring 87 has an elongated slot 91 to receive the end of the rod 76 extending through the upwardly facing slots 84 (see FIG. 19) and 85.

Accordingly, the rod 76 (see FIG. 18) extends through the opening 81 formed at the side wall 16 of the body 12. Then, the other end of the rod 76 is disposed in the upwardly facing slots 84 (see FIG. 19) and 85 with the leaf spring 87 moved to its phantom line position of FIGS. 18 and 19. Release of the leaf spring 87 enables the other end of the rod 76 (see FIG. 18) to enter the opening 91 in the leaf spring 87 to retain the rod 76 while enabling the canopy 70 to pivot about the rod 76 relative to the body 12.

A cotter pin 92 extends through a passage 93 (see FIG. 20) in the rod 76 adjacent the flattened bottom end 79' (see FIG. 18) of the vertical leg 80 of the front upper frame 73. The ends of the cotter pin 92 are then bent outwardly as shown in FIG. 20 to retain the cotter pin 92 attached to the rod 76.

The rod 76 has a second cotter pin (not shown) mounted therein adjacent the flattened bottom end 77' (see FIG. 18) of the vertical leg 78 of the front upper frame 73 of the canopy frame 71 in the same manner as the cotter pin 92. The cotter pin 92 and the second cotter pin limit any axial shifting of the rod 76.

The rod 76 has an O-ring 95 thereon adjacent the side tube 74 to retain the side tube 74 when the canopy 70 is removed from the body 12. The O-ring 95 also reduces noise by preventing rubbing of the metal side tube 74 against the reinforcing tab 86 (see FIG. 19). A similar arrangement exists for the rod 76 (see FIG. 18) adjacent the side tube 75.

Figure 6:
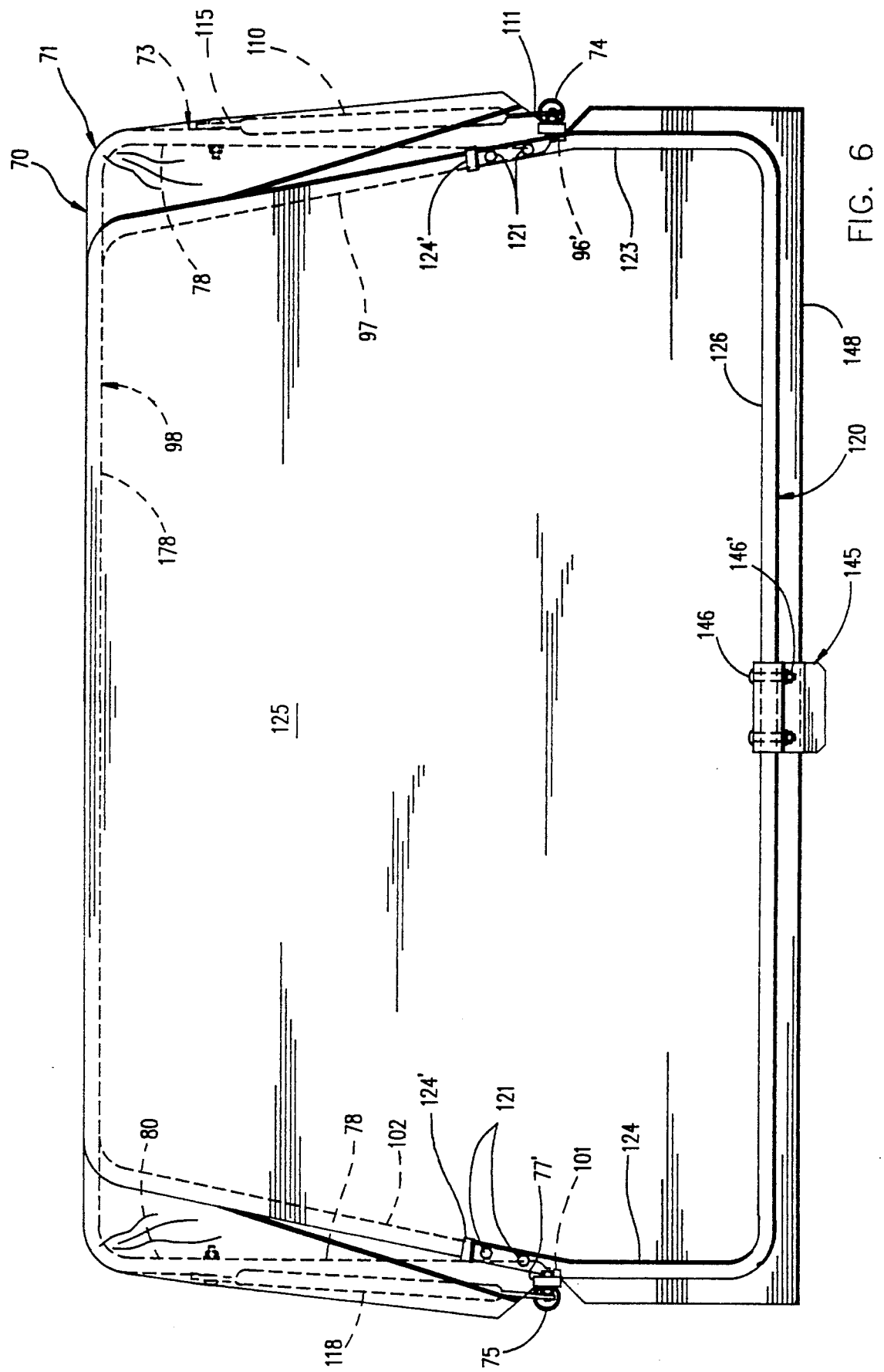
FIG. 6 is a rear elevational view of the body and the canopy of the cart of FIG. 1 in its tow position with other parts omitted for clarity purposes.

The side tube 74 has a flattened rear end 96 (see FIG. 21) to which a flattened bottom end 96' of a substantially vertical leg 97 (see FIG. 6), which is a hollow tube, of a rear upper frame 98, which is U-shaped, is pivotally connected through a bolt 99 (see FIG. 21) and a nut 100. The side tube 75 (see FIG. 6) is similarly connected to a flattened bottom end 101 of a substantially vertical leg 102 of the rear upper frame 98.

As shown in FIG. 1A, the leg 97 of the rear upper frame 98 is formed with a lower upstanding or vertical portion 103 and an upper portion 104 angled forwardly from the lower portion 103. The vertical leg 102 (see FIG. 6) of the rear upper frame 98 is similarly formed.

Figure 21:
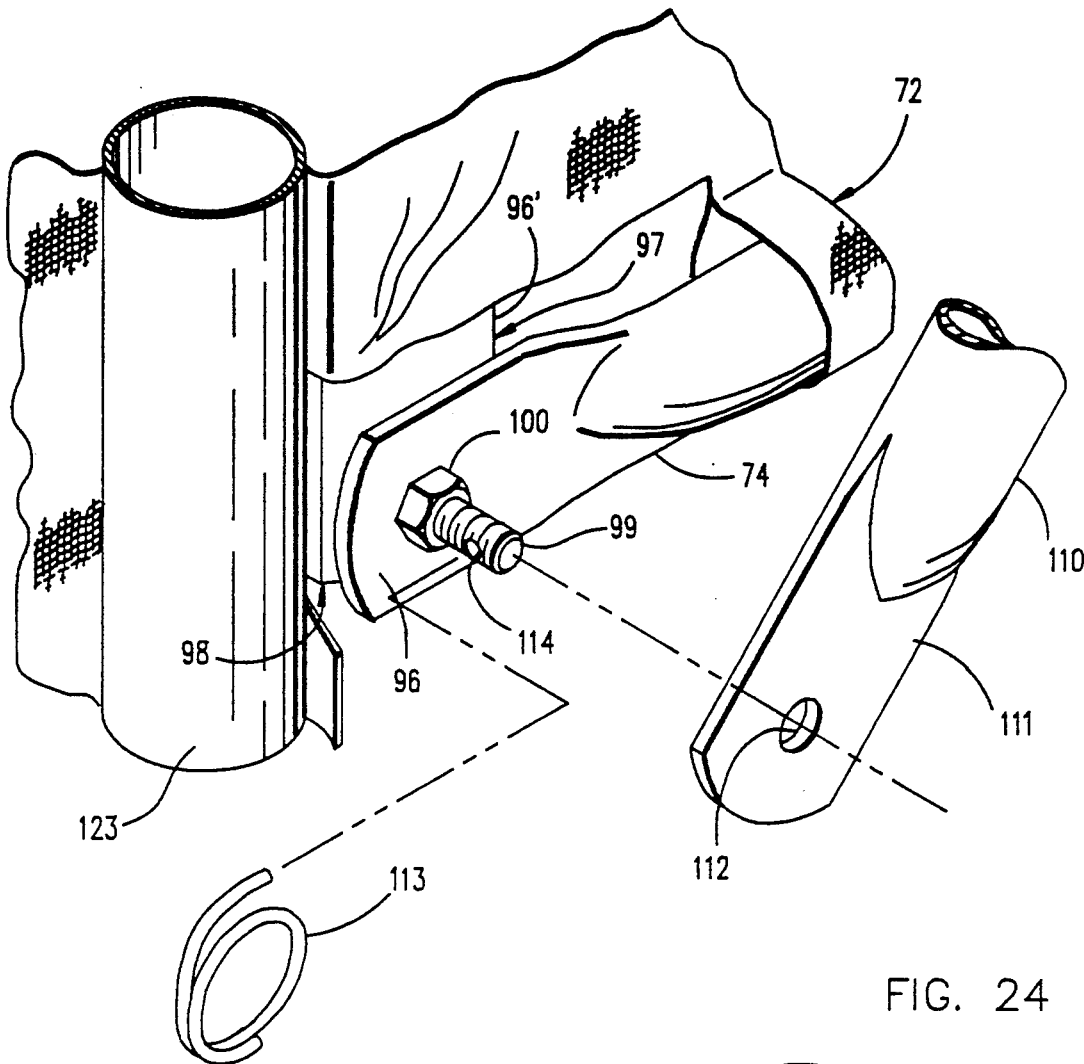
FIG. 21 is an enlarged fragmentary perspective view of a portion of the canopy frame of FIG. 1.

A side support or strut 110 (see FIG. 1A) extends diagonally from an intermediate portion of the leg 78 of the front upper frame 73 to the pivotal connection of the leg 97 of the rear upper frame 98 and the side tube 74. As shown in FIG. 21, the side support 110 has a flattened rear end 111 having an opening 112 therein to receive the bolt 99 exterior of the nut 100 to pivotally mount the side support 110 on the bolt 99. A lock ring 113 extends through a drilled passage 114 in the bolt 99 to retain the side support 110 on the bolt 99.

Figure 22:
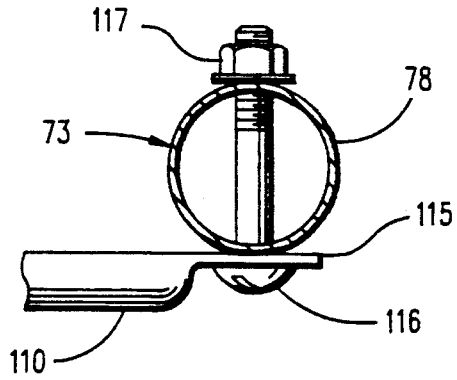
FIG. 22 is a fragmentary sectional view of the connection of a side support to a leg of a front upper frame of the canopy frame and taken along line 22—22 of FIG. 1A.

The side support 110 has a flattened front end 115 (see FIG. 22) for cooperation with the leg 78 of the front upper frame 73 so that the side support 110 can be connected to the leg 78 of the front upper frame 73 by a bolt 116 and a lock nut 117. A side support or strut 118 (see FIG. 3), which is identical to the side support 110 (see FIG. 1A), extends in a similar manner between the leg 80 (see FIG. 3) of the front upper frame 73 and the leg 102 of the rear upper frame 98. There also is a pivotal connection between the side support 118 (see FIG. 6), the side tube 75, and the leg 102 of the rear upper frame 98 in the same manner as the side support 110 (see FIG. 21) is pivotally connected to the leg 97 of the rear upper frame 98 and the side tube 74.

A rear bottom frame 120 (see FIG. 6), which is U-shaped, is secured to the rear upper frame 98 by bolts 121 and nuts (not shown) to form a rear frame support. The bolts 121 attach an overlying portion of a leg 123 of the rear bottom frame 120 to the leg 97 of the rear upper frame 98 and an overlying portion of a leg 124 of the rear bottom frame 120 to the leg 102 of the rear upper frame 98. Each of the legs 123 and 124 has a vinyl cap 124' to close its open upper end.

The rear upper frame 98 and the rear bottom frame 120, which cooperate to form the rear frame support, have an end closure 125 supported thereby to close the open rear end 20 (see FIG. 4) of the body 12 when the canopy 70 (see FIG. 1A) is in its closed position. The end closure 125 (see FIG. 6) may be formed of any suitable semi-rigid material such as polyethylene, for example. When the end closure 125 is formed of polyethylene, the polyethylene preferably has a thickness of 0.040".

The cover material 72 (see FIG. 1A) is formed in substantially the same manner as in the aforesaid Doering et al application. The end closure 125 (see FIG. 6) is attached to the cover material 72 (see FIG. 1A) in substantially the same manner as shown and described in the aforesaid Doering et al application.

The end closure 125 (see FIG. 6) also is attached to each of the legs 123 and 124 of the rear bottom frame 120 and to a horizontal tube 126 of the rear bottom frame 120 by snap-in plugs, which are plastic with serrated sides. Thus, the end closure 125 is rigidly positioned.

Figure 17:
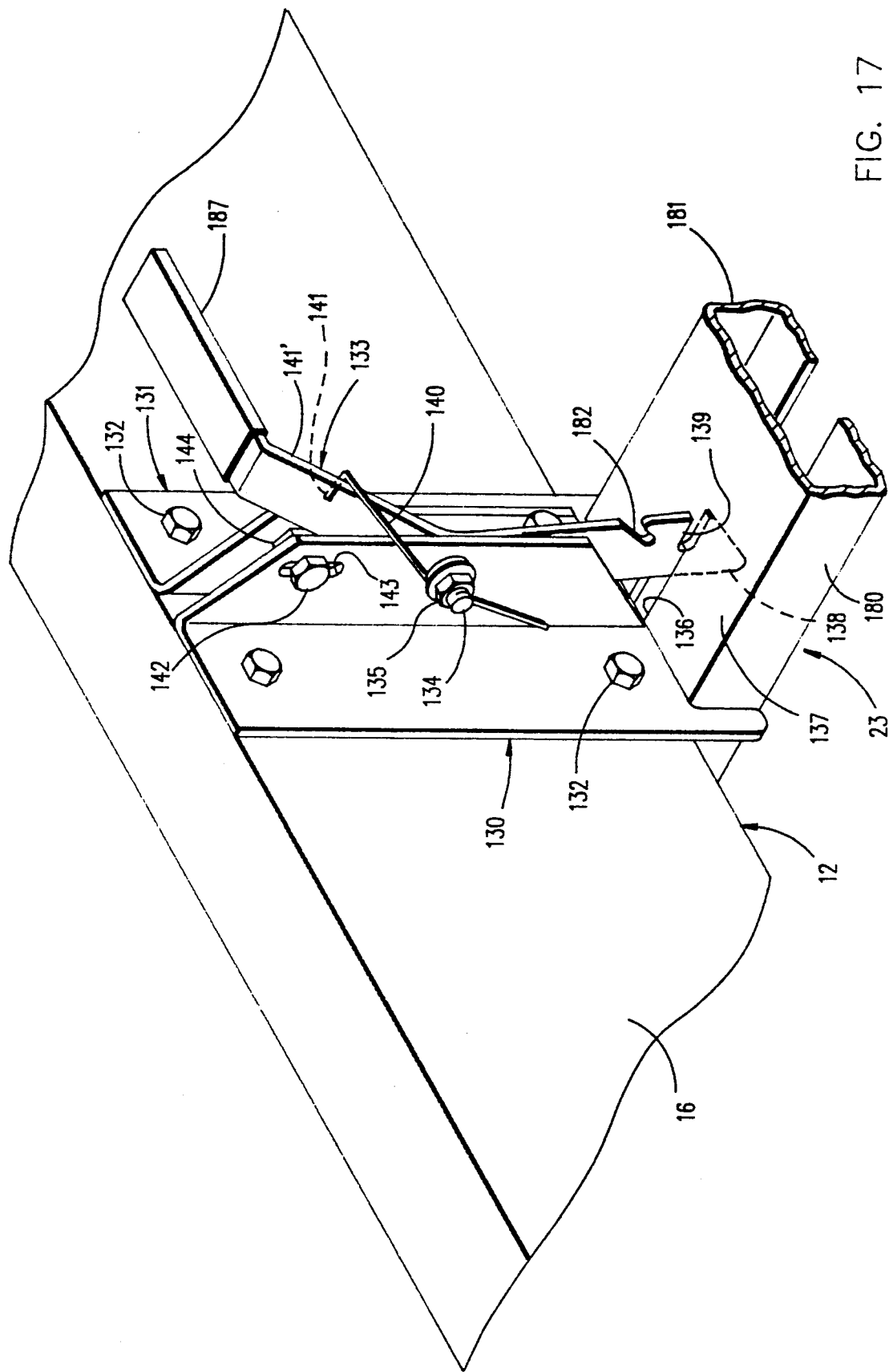
FIG. 17 is an enlarged fragmentary perspective view of a mounting arrangement for mounting the second actuating mechanism on the cart body.

The body 12 (see FIG. 1A) of the collector cart 10 is retained in its non-dumping or tow position through being locked to the tow bar 23 to prevent relative pivoting therebetween about the pivotal connecting means 24. The body 12 has two L-shaped brackets 130 (see FIG. 17) and 131 secured to the front wall 16 of the body 12 by bolts 132 and nuts 132' (see FIG. 7). A lock handle 133 (see FIG. 17) is pivotally mounted on the L-shaped brackets 130 and 131 by a bolt 134 and a nut 135.

The tow bar 23 has a longitudinal slot 136 in its top wall 137 to receive a lower portion 138 of the lock handle 133. The lower portion 138 of the lock handle 133 has a slot 139 to receive a portion of the top wall 137 of the tow bar 23 at the front end of the slot 136 when the lower portion 138 of the lock handle 133 is disposed within the longitudinal slot 136 in the top wall 137 of the tow bar 23 to lock the lock handle 133 to the tow bar 23.

A torsion spring 140, which is wrapped around the bolt 134 adjacent the L-shaped bracket 130 and has its other end 141 bearing against a side 141' of the lock handle 133, continuously urges the lock handle 133 counterclockwise about the bolt 134. The torsion spring 140 holds the end of the slot 139 in the lower portion 138 of the lock handle 133 in position to receive the portion of the top wall 137 of the tow bar 23 at the front end of the longitudinal slot 136 to lock the body 12 to the tow bar 23 so that the body 12 is maintained in its non-dumping or tow position.

An adjustable stop bolt 142, which extends through a vertical slot 143 in the L-shaped bracket 130 and a corresponding vertical slot (not shown) in the L-shaped bracket 131 and cooperates with a nut (not shown) to be retained in position, has a spacer 144 mounted thereon between the L-shaped brackets 130 and 131. The adjustable stop bolt 142 controls the position of the lower portion 138 of the lock handle 133 through adjustment in the vertical slot 143 in the L-shaped bracket 130 and the corresponding vertical slot (not shown) in the L-shaped bracket 131.

When the body 12 is in its non-dumping or tow position, the canopy 70 (see FIG. 1A) has its rear end locked to the rear end of the body 12. The rear bottom frame 120 of the frame 71 of the canopy 70 has a rear latch lock 145 secured to the bottom horizontal tube 126 of the rear bottom frame 120 by bolts 146 (see FIG. 6) and nuts 146'. The rear latch lock 145 has a portion 147 (see FIG. 1) extending below a U-shaped channel 148 of the body 12. Thus, the canopy 70 is locked to the body 12 at its rear end so that it cannot be raised by lifting on the rear of the canopy 70.

Figure 5:
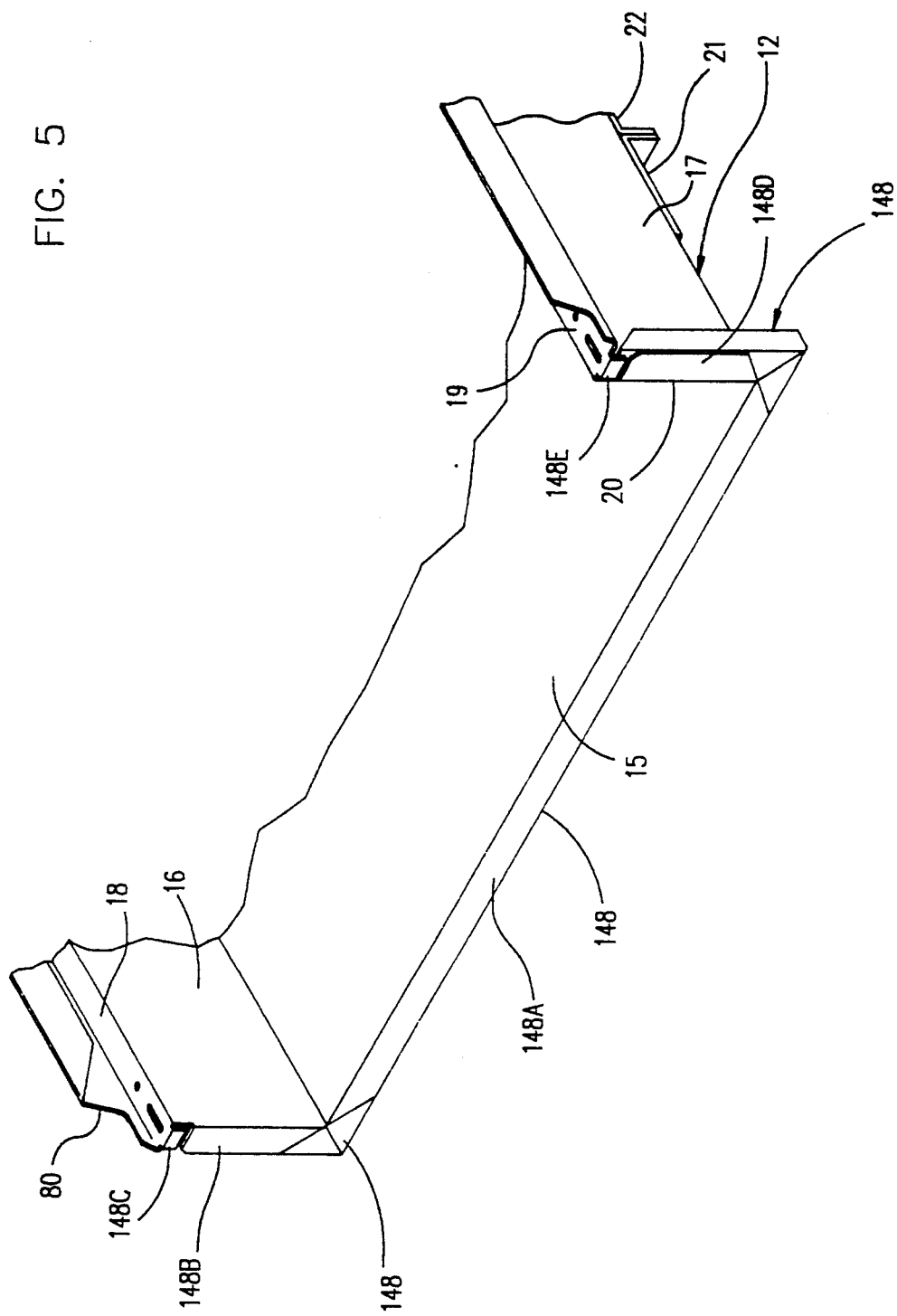
FIG. 5 is a fragmentary rear perspective view of a portion of the cart body of FIG. 4.

The U-shaped channel 148 of the body 12 is spot welded to inner surfaces of a flange 148A (see FIG. 5) extending downwardly from the rear of the bottom wall 15 of the body 12, a flange 148B extending outwardly from the side wall 16 of the body 12, a flange 148C extending downwardly from the top flange 18 of the side wall 16, a flange 148D extending outwardly from the side wall 17 of the body 12, and a flange 148E extending downwardly from the top flange 19 of the side wall 17. The flanges 148A, 148B, 148C, 148D, and 148E are in the same vertical plane.

Figure 8:
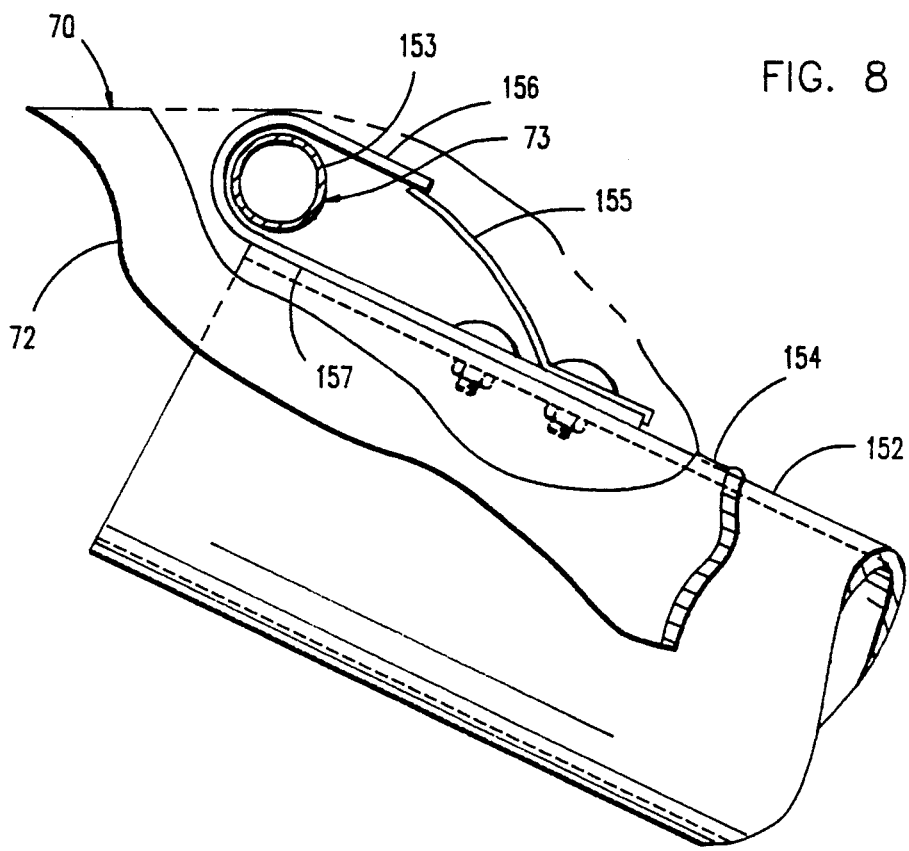
FIG. 8 is a fragmentary elevational view, partly in section, of a portion of the canopy frame and showing its connection to a chute transporting debris to the interior of the canopy.

With the canopy 70 (see FIG. 1A) resting on top of the body 12 and locked thereto by the rear latch lock 145, the debris picked up by the riding lawn mower 11 (see FIG. 1B) is supplied from an outlet 149 in a mower deck 150 of the riding lawn mower 11 through a first chute 151. The first chute 151 has a telescoping arrangement with a second and larger chute 152, which has its upper end connected to an upper horizontal tube 153 (see FIG. 8) of the front upper frame 73.

The upper end of the second chute 152 extends into a sleeve 154, which is formed of knitted polyester cloth, attached to a front portion of the cover material 72 of the canopy 70 with the end of the sleeve 154 having elastic therearound to grip against the outer surface of the second chute 152. The second chute 152 is attached to the upper horizontal tube 153 of the front upper frame 73 by a flat spring 155 attached to the second chute 152 cooperating with an extension 156 of a retainer 157, which is secured to the second chute 152. Debris, which is supplied through the first chute 151, passes through the second chute 152 and is received by the sleeve 154 for entry into the interior of the canopy 70.

Thus, connection of the upper end of the second chute 152 to the front upper frame 73 is accomplished by depressing the flat spring 155 until after the extension 156 of the retainer 157 has passed around the upper horizontal tube 153 of the front upper frame 73. Then, the flat spring 155 is released to its retaining position of FIG. 8.

When the canopy 70 is in its closed position of FIG. 1A in which the rear latch lock 145 has the portion 147 disposed beneath the channel 148 of the body 12, a release handle 160 and the lock handle 133 are in the solid line position of FIG. 1A. This is the non-dumping or tow position of the body 12 of the cart 10.

Figure 23:
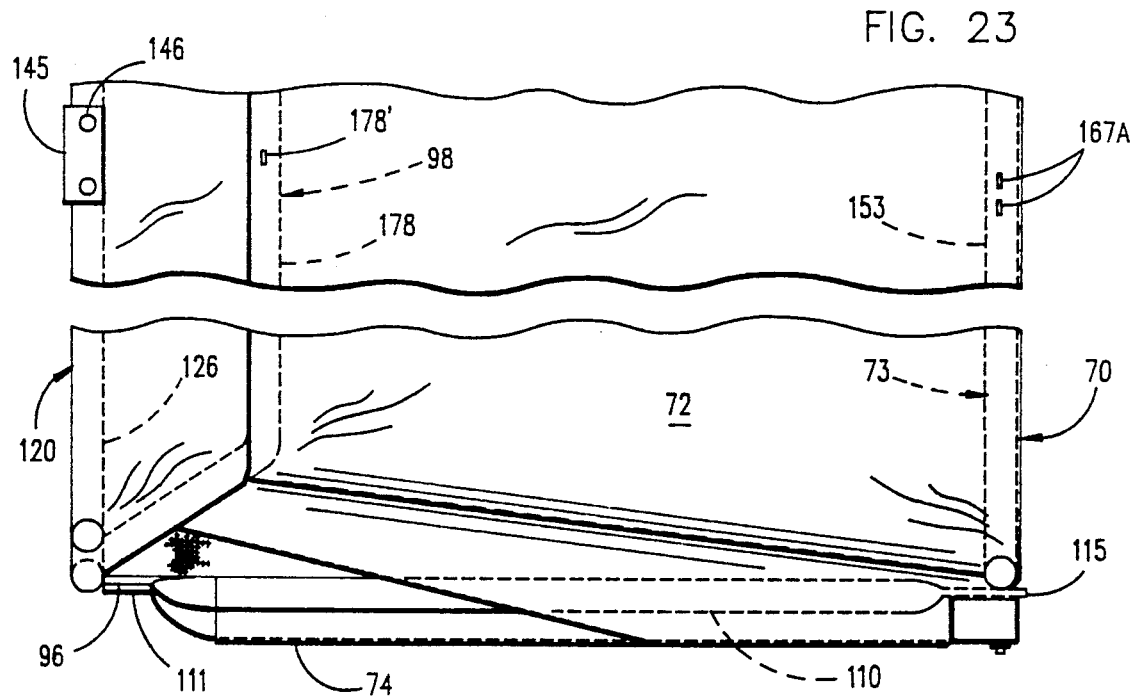
FIG. 23 is a fragmentary top plan view of a portion of the canopy of the cart of FIG. 1.
Figure 16:
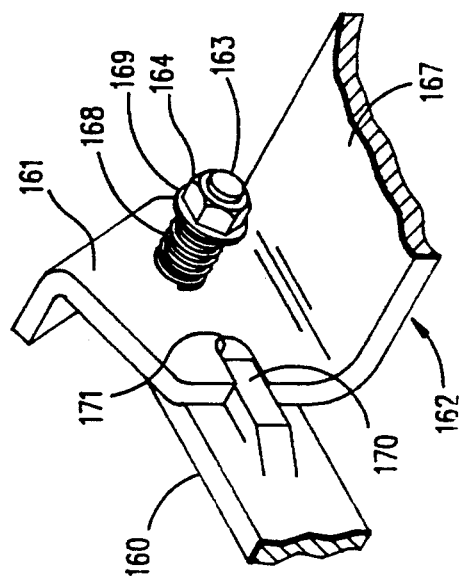
FIG. 16 is an enlarged fragmentary perspective view showing a handle of the first actuating mechanism being retained in the position in which the canopy is in its closed position.
Figure 15:
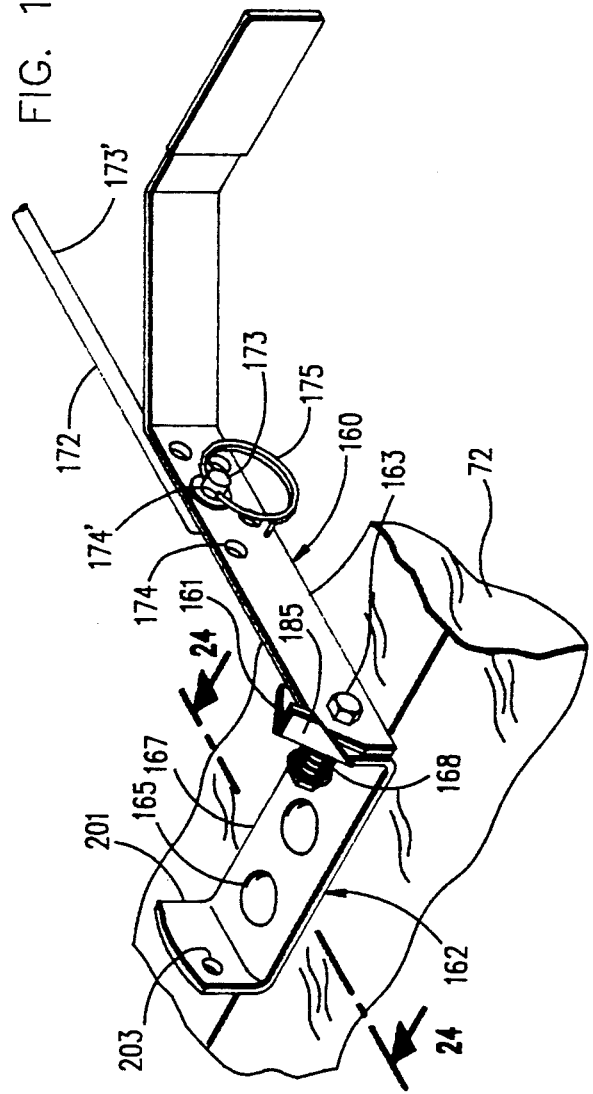
FIG. 15 is an enlarged fragmentary perspective view showing the mounting arrangement for mounting the first actuating mechanism on the canopy frame.
Figure 24:
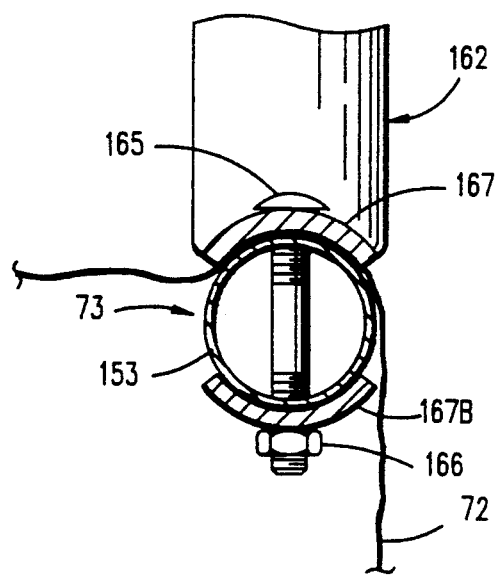
FIG. 24 is a fragmentary sectional view of a portion of the mounting arrangement of FIG. 15 and taken along line 24—24 of FIG. 15.

The release handle 160 (see FIG. 15) has one end pivotally connected to an ear 161 of a bracket 162 by a bolt 163 and a nut 164 (see FIG. 16). The bracket 162 is secured to the upper horizontal tube 153 (see FIG. 24) of the front upper frame 73 by suitable means such as carriage bolts 165 and nuts 166. Each of the carriage bolts 165 extends through a base 167 of the bracket 162, a slot 167A (see FIG. 23) in the cover material 72, the upper horizontal tube 153 (see FIG. 24) of the front upper frame 73, and a bracket support 167B for cooperation with one of the nuts 166.

A spring 168 (see FIG. 16) is disposed between a washer 169 on the bolt 163 and the ear 161 of the bracket 162 to urge the release handle 160 to the position in which a lock detent 170 on the release handle 160 is disposed in a slot 171 in the ear 161 of the bracket 162. The force of the spring 168 retains the lock detent 170 in the slot 171 in the ear 161 of the bracket 162 to hold the release handle 160 in the solid line position of FIG. 1A, which is the non-dumping or tow position of the body 12 of the cart 10.

Intermediate its ends, the release handle 160 (see FIG. 15) is pivotally connected to a release link 172 through having a first bent end 173 of the release link 172 extending through one of five holes 174 in the release handle 160. The first bent end 173, which is substantially perpendicular to a main portion 173' of the release link 172, has a passage 174' drilled therethrough to receive a lock ring 175

Figure 14:
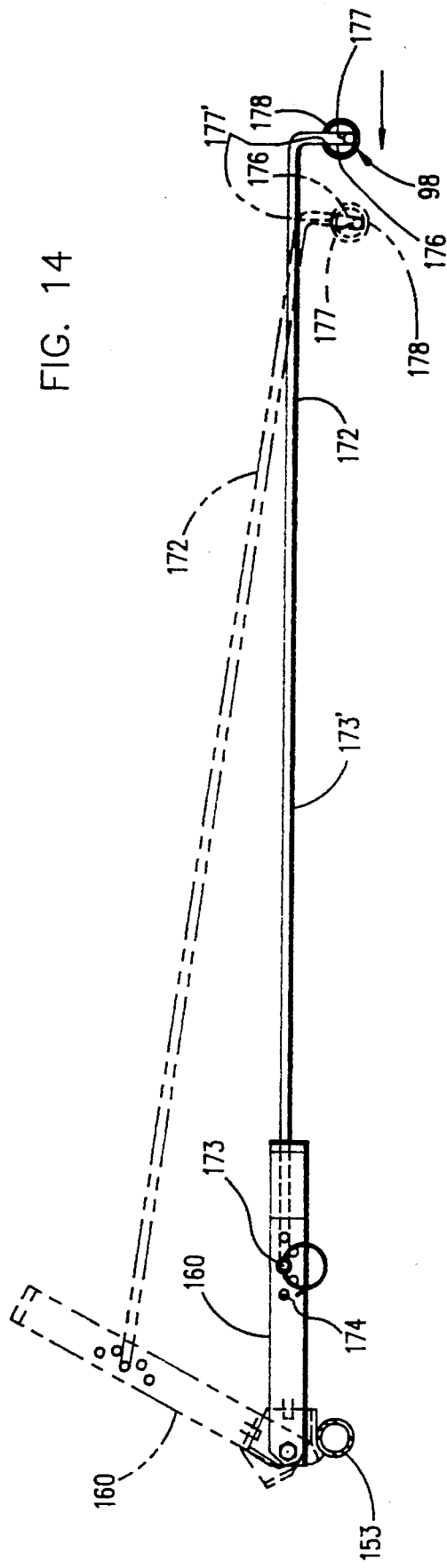
FIG. 14 is a side elevational view of the first actuating mechanism connected to a portion of the canopy frame.

The other end of the main portion 173' of the release link 172 terminates in a second bent end 176 (see FIG. 14), which is substantially perpendicular to the main portion 173' of the release link 172 and to the first bent end 173. The second bent end 176 of the release link 172 has a third bent end 177 extending therefrom substantially perpendicular thereto and substantially parallel to the first bent end 173. The first bent end 173 and the third bent end 177 extend in the same direction from the main portion 173' of the release link 172.

The second bent end 176 of the release link 172 is disposed within an opening 177' in an upper horizontal tube 178 of the rear upper frame 98 after passing through a slot 178' (see FIG. 23) in the cover material 72 of the canopy 70. It should be understood that the third bent end 177 (see FIG. 14) of the release link 172 initially passed through the slot 178' (see FIG. 23) in the cover material 72 of the canopy 70 and the opening 177' (see FIG. 14) in the upper horizontal tube 178 of the rear upper frame 98 prior to the second bent end 176. The second bent end 176 of the release link 172 is pivotally mounted within the opening 177' in the upper horizontal tube 178 of the rear upper frame 98. Thus, the effective length of the release link 172 is changed in accordance with which of the five holes 174 in the release handle 160 that the first bent end 173 of the release link 172 is disposed.

The amount of tension applied to the lower rear frame 120 (see FIG. 6) is adjustable in accordance with which of the holes 174 (see FIG. 14) that the first bent end 173 of the release link 172 is disposed. The least amount of tension occurs when the first bent end 173 of the release link 172 is disposed in the leftmost of the holes 174 in the solid line position of FIG. 14. The maximum tension is when the first bent end 173 of the release link 172 is positioned within the rightmost of the holes 174 in the solid line position of FIG. 14. This adjustable tension compensates for manufacturing variances in the cover material 72 (see FIG. 1A) of the canopy 70.

When the lock handle 133 is holding the cart body 12 in its non-dumping or towing position of FIG. 1A, a safe lock clip 179, which has its ends pivotally mounted in substantially parallel side walls 180 (see FIG. 17) and 181 of the tow bar 23, is disposed in a slot 182 (see FIG. 7) in the lower portion 138 of the lock handle 133. This retains the lock handle 133 against any accidental release from its locking position in which it locks the body 12 to the tow bar 23. The side wall 180 of the tow bar 23 has a detent button 183 formed therein to maintain the safe lock clip 179 in its locking (solid line) position of FIG. 7.

When it is desired to dump the debris thrown into the collector cart 10 (see FIG. 1A) from the riding lawn mower 11 (see FIG. 1B) through the chutes 151 and 152, the operator drives the riding lawn mower 11 to the area in which the material in the collector cart 10 (see FIG. 1A) is to be dumped. This usually necessitates backing of the riding lawn mower 11 (see FIG. 1B). The caster wheels 32 (see FIG. 1A) enable backing of the collector cart 10 without any jackknifing of the collector cart 10. This also eliminates the necessity for maneuvering the riding lawn mower 11 (see FIG. 1B).

When the collector cart 10 (see FIG. 1A) is ready to have the material dumped therefrom, the operator remains on a seat 184 (see FIG. 1B) of the riding lawn mower 11 and pulls sideways on the release handle 160 (see FIG. 1A) to overcome the force of the spring 168 (see FIG. 16) to remove the lock detent 170 from the slot 171 in the ear 161 of the bracket 162. After the lock detent 170 is removed from the slot 171 in the ear 161 of the bracket 162, the release handle 160 is pulled upwardly to cause clockwise (as viewed in FIG. 1A) pivoting of the release handle 160 about the bolt 163 (see FIG. 15).

This clockwise (as viewed in FIG. 1A) pivoting of the release handle 160 causes the rear upper frame 98 and the rear bottom frame 120 to pivot clockwise (as viewed in FIG. 1A) about the bolt 99 (see FIG. 21). This removes the rear latch lock 145 (see FIG. 1A) from its solid line position to its phantom line position as shown by an arrow 184'.

The release handle 160 is pivoted to its phantom line position of FIG. 1A in which the release handle 160 is about 30° from the vertical. In this position, the release handle 160 engages a flange 185 (see FIG. 15) on the ear 161 of the bracket 162.

Figure 2:
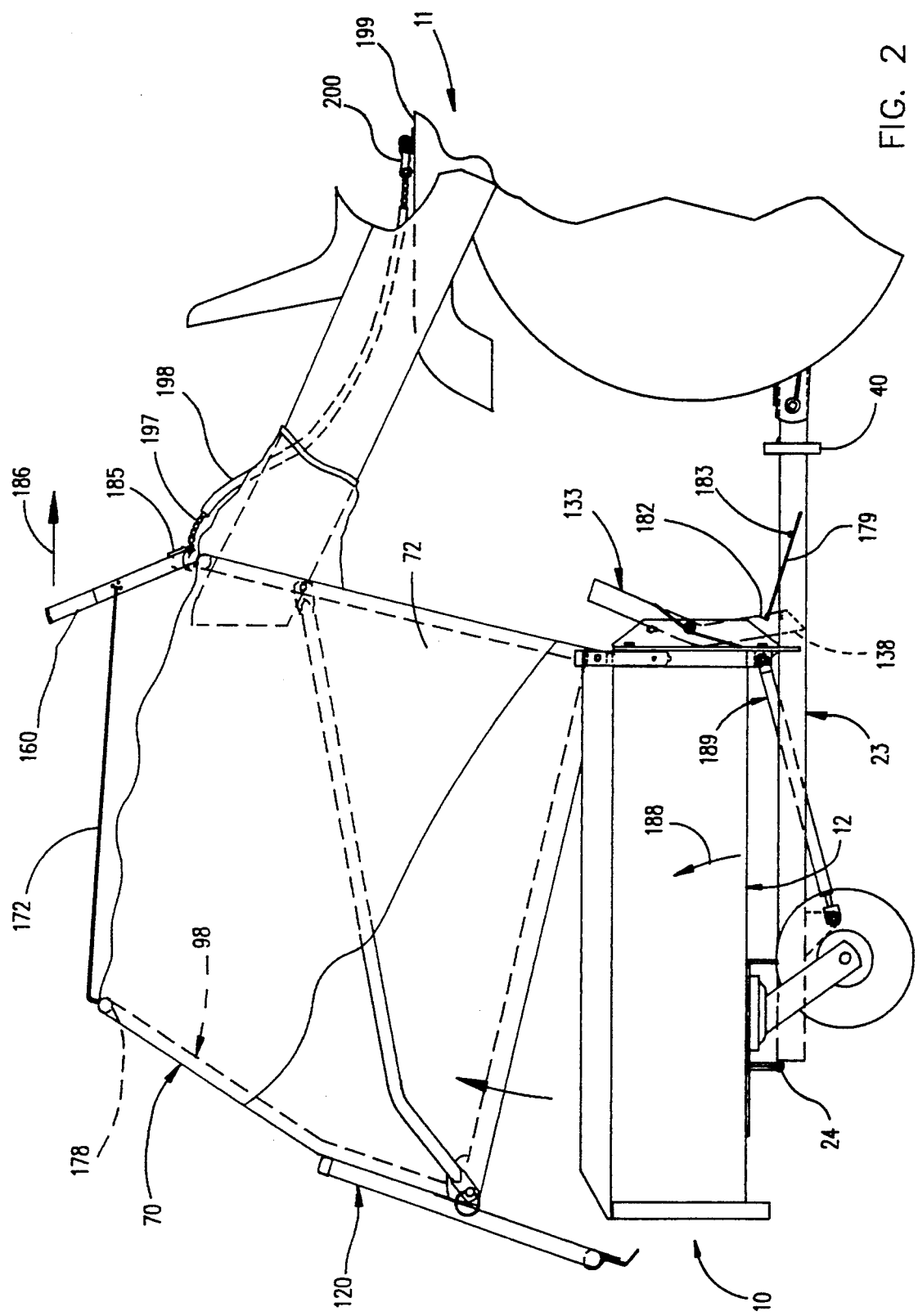
FIG. 2 is a fragmentary right side elevational view, similar to FIG. 1, of a portion of the cart of FIG. 1 and showing further motions of the one actuating mechanism to move the frame of the canopy further from the cart body.

Continued forward pulling of the release handle 160 (see FIG. 2) in the direction of an arrow 186 causes the canopy 70 to pivot to the position of FIG. 2 from the phantom line position of FIG. 1A. In the position of FIG. 2, the release handle 160 can be employed to shake the canopy 70 to aid in breaking loose any debris that has bulged against the cover material 72 of the canopy 70 and against the end closure 125 (see FIG. 6) during filling. This eliminates the resistance of the normal lifting force to move the canopy 70 (see FIG. 2) away from the body 12.

During filling of the interior of the body 12 and the canopy 70, the up and down motion of the collector cart 10 during its travel across the ground tends to pack the debris. This debris is initially packed against the end closure 125 (see FIG. 6) and then against the sides of the cover material 72 (see FIG. 2) of the canopy 70.

The pivoting of the rear upper frame 98 (see FIG. 2) and the rear bottom frame 120 removes the end closure 125 (see FIG. 6) away from the packed debris so that it is no longer tightly packed thereagainst. The shaking of the release handle 160 (see FIG. 2) releases the packed material against the sides of the cover material 72 of the canopy 70.

Figure 3:
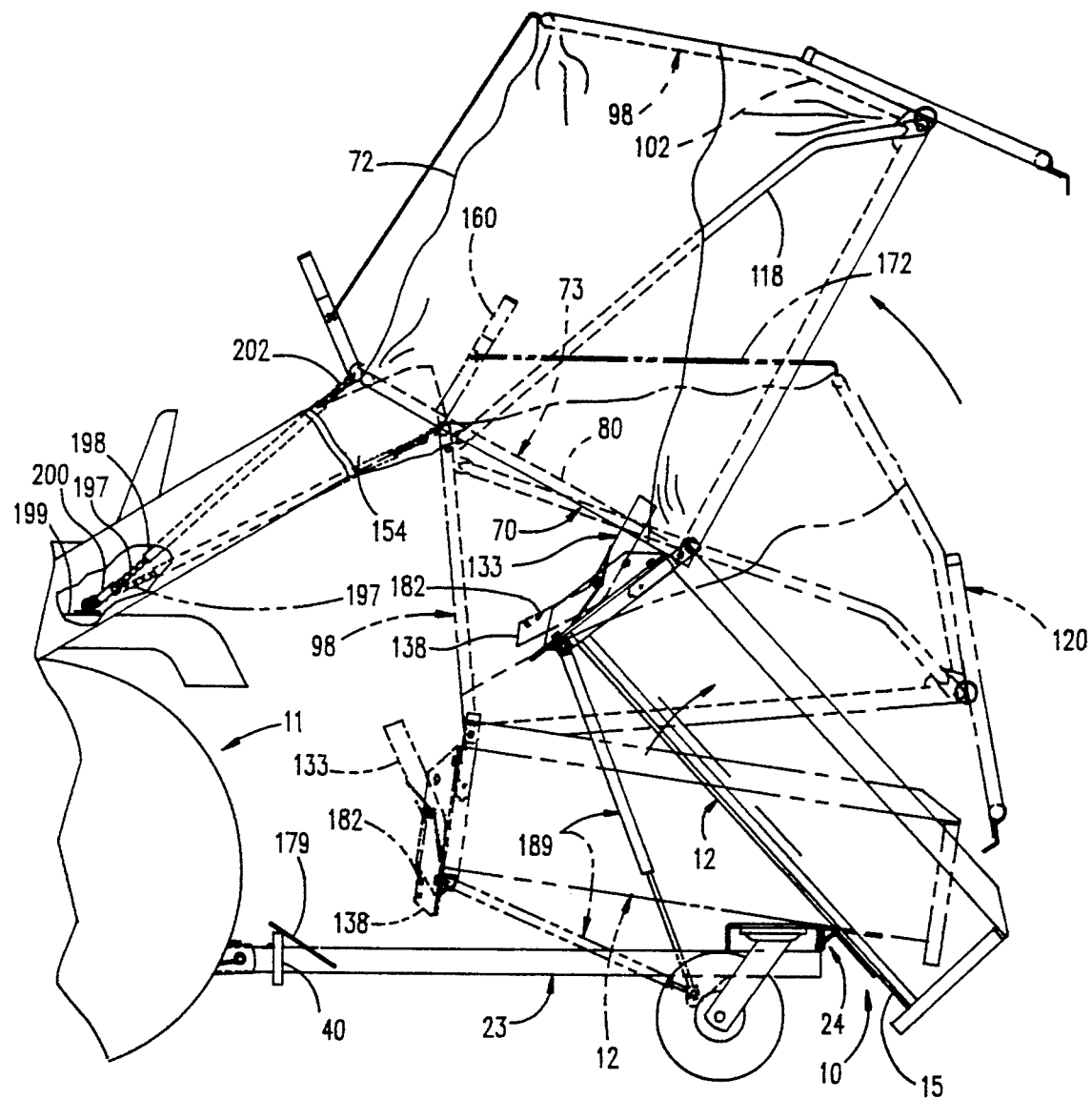
FIG. 3 is a fragmentary left side elevational view of a portion of the cart of FIG. 1 and showing initial movement of the other of the two actuating mechanisms to disconnect the other actuating mechanism from the tow bar and the cart body starting to pivot in phantom lines and the cart body pivoted to the position in which the cart body and the canopy are in their dumping positions in solid lines.

After the release handle 160 has moved to its position of FIG. 2, the safe lock clip 179 is moved out of the slot 182 in the lower portion 138 of the lock handle 133 and rotated clockwise (as viewed in FIG. 2) past the detent button 183 (see FIG. 7) in the side wall 180 of the tow bar 23 to its position in FIG. 3 in which the safe lock clip 179 rests against the mounting plate 40 at the forward end of the tow bar 23. The operator then grasps an extending portion 187 (see FIG. 17) of the lock handle 133 and causes it to pivot clockwise about the bolt 134 against the force of the torsion spring 140 to remove the slot 139 in the lower portion 138 of the lock handle 133 from the portion of the top wall 137 of the tow bar 23 at the front end of the longitudinal slot 136. Then, the operator lifts upwardly on the extending portion 187 of the lock handle 133 to cause the body 12 to pivot to the phantom line position of FIG. 3 in the direction of an arrow 188 (see FIG. 2) about the pivotal connecting means 24.

After the lock handle 133 (see FIG. 7) is rotated clockwise about the bolt 134 to unlock the body 12 (see FIG. 2) from the tow bar 23, the effort required by the operator to lift upwardly on the lock handle 133 is minimal. This is because the stored energy in a gas cylinder 139 is capable of assisting pivoting of the body 12 about the pivotal connecting means 24. The gas cylinder 189 is loaded in its closed position of FIG. 7. It should be understood that the gas cylinder 189 is the type used in the automotive industry to assist in holding up trunk lids, hoods, hatchback doors, and the like.

The gas cylinder 189 has a plastic ball socket 190 (see FIG. 25) on the bottom end of its piston rod 191 (see FIG. 7) pivotally mounted on a ball stud 192 (see FIG. 25) on a bracket 193, which is mounted on the side wall 181 (see FIG. 17) of the tow bar 23 and extends downwardly therefrom. A retaining clip 194 (see FIG. 25) retains the ball socket 190 on the ball stud 192. In the same manner as the ball socket 190 is mounted on the ball stud 192, the gas cylinder 189 (see FIG. 7) has a plastic ball socket on its upper end pivotally mounted on a ball stud on a bracket 196 secured to the body 12 by two of the bolts 132 and two of the nuts 132'. Accordingly, the gas cylinder 189 assists pivoting of the body 12 counterclockwise about the pivotal connecting means 24 when the lock handle 133 is no longer locked to the tow bar 23.

When the body 12 reaches the phantom line position of FIG. 3, the canopy 70 is restrained from following this pivotal motion. This is because a chain 197, which has a protective cover 198, of a fixed length has one end attached to a portion 199 of the riding lawn mower 11 by a spring hook 200 such as used for connecting a dog leash to a dog collar. It should be understood that the one end of the chain 197 may be secured to other portions of the riding lawn mower 11. The other end of the chain 197 is attached to an ear 201 (see FIG. 15) on the bracket 162 through having an S-shaped hook 202 (see FIG. 3) connected to an opening 203 (see FIG. 15) in the ear 201.

Therefore, as the front end of the body 12 (see FIG. 3) pivots upwardly from its phantom line position to its dumping (solid line) position, the chain 197, which also may be a rope or cable, causes the canopy 70 to begin to pivot about the axis of the rod 76 (see FIG. 18). Thus, as shown in the solid line position of FIG. 3, there is a clam shell relation between the body 12 and the canopy 70. When the body 12 reaches its dumping position, the canopy 70 is completely raised therefrom as shown in FIG. 3.

The exact length of the chain 197 can be adjusted to increase or decrease the opening angle of the canopy 70. Accordingly, the opening angle of the canopy 70 increases as the length of the chain 197 decreases and decreases as the length of the chain 197 increases. The increased length of the chain 197 delays when the chain 197 becomes taut so that this permits additional motion of the body 12 before rotation of the canopy 70 begins. After the chain 197 becomes taut, continued pivoting of the body 12 causes rotation of the canopy 70 counterclockwise while the body 12 continues to pivot clockwise until pivoting of the body 12 is stopped in the solid line position of FIG. 3 by maximum extension of the gas cylinder 189.

When the body 12 reaches the solid line position of FIG. 3, the angle of the bottom wall 15 and the relation of the canopy 70 to the body 12 is such that all debris collected within the collector cart 10 is dumped therefrom. The open rear end 20 (see FIG. 4) of the body 12 allows all debris within the body 12 to fall therefrom. As shown in the solid line position of FIG. 3, the angle of the canopy 70 is such that any material remaining therein will fall by gravity into the body 12.

When the body 12 reaches the solid line position of FIG. 3, the gas cylinder 189 will hold or retain the body 12 in the dumping (solid line) position of FIG. 3. This insures that the body 12 remains in the solid line position of FIG. 3 when the lock handle 133 is released. Accordingly, this avoids the operator having to hold the lock handle 133 throughout the dumping of the debris from the collector cart 10.

When dumping of debris from the collector cart 10 has been completed, the operator grasps the lock handle 133 and pulls it forwardly and downwardly until the lock handle 133 is again locked to the tow bar 23 as shown in FIG. 7. Then, the safe lock clip 179 is disposed within the slot 182 in the lower portion 138 of the lock handle 133. Next, the release handle 160 (see FIG. 3) is moved clockwise (as viewed in FIG. 3) until the release handle 160 is again locked to the bracket 162 (see FIG. 16) by the lock detent 170 being disposed within the slot 171 in the ear 161 of the bracket 162.

When the front upper frame 73 (see FIG. 1A) is pivoted to its collapsed position and the rear upper frame 98 and the rear lower frame 120 are similarly pivoted to their collapsed position, the front upper frame 73 will not engage the rear upper frame 98 or the rear bottom frame 120. By removing the connection of the second chute 152 (see FIG. 8) to the upper horizontal tube 153 of the front upper frame 73 by pushing downwardly on the flat spring 155 and removing the extension 156 of the retainer 157 from engagement with the upper horizontal tube 153 of the front upper frame 73 and then disconnecting the rod 76 (see FIG. 18) from the body 12 through first pulling the leaf spring 87 to its phantom line position to enable one end of the rod 76 to be withdrawn from the upwardly facing slots 84 (see FIG. 19) and 85 and then withdrawing the rod 76 (see FIG. 18) from the opening 81, the canopy 70 (see FIG. 1A) can be removed from its mounting on the body 12 and stored in its collapsed condition, which requires a very small volume for storage.

The front wall 13 (see FIG. 4) of the body 12 has a handle 204 fixed thereto. The handle 204 may be used to manually pivot the body 12 when the operator is not on the riding lawn mower 11 (see FIG. 1B) and the lock handle 133 (see FIG. 1A) is unlocked from the tow bar 23.

It should be understood that the collector cart 10 may be employed as a utility cart. This is accomplished by removing the canopy 70 without any tools and installing a tailgate (not shown) such as shown in the aforesaid Doering patent to close the open rear end 20 (see FIG. 4) of the body 12.

It should be understood that the gas cylinder 189 (see FIG. 3) is manufactured with a desired precompressed gas pressure to enable the gas cylinder 189 to aid in lifting the body 12 of the cart 10 to the solid line position of FIG. 3 and retain it therein. The precompressed pressure of the gas is preferably in the range of 100-120 pounds.

An advantage of this invention is that it eliminates the need for any tool to remove the canopy from the body of the collector cart. Another advantage of this invention is that there is no requirement for any tool to connect the cart to its pulling means such as a riding lawn mower or tractor, for example. A further advantage of this invention is that the cart can be easily connected to various hitches on the pulling means.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A collector cart for towing by pulling means including:
   a body having a bottom wall, side walls, a front wall, and an open rear end;
   pull connecting means extending forwardly of said body for connection to the pulling means;
   wheel means supporting said pull connecting means;
   body mounting means for mounting said body for pivotal movement relative to said wheel means and said pull connecting means;
   a canopy including:
      a frame;
      and a cover mounted on said frame;
   frame pivotal mounting means for mounting said frame on top of said body solely for pivotal movement of said canopy between a closed position and a dumping position, said frame pivotal mounting means being disposed adjacent the front of each of said frame and said body;
   said frame including closing means for closing said open rear end of said body when said canopy is in its closed position;
   said cover of said canopy having receiving means for receiving debris into the interior of said cover of said canopy and the interior of said body when said canopy is in its closed position when mounted on top of said body in which an enclosed chamber is formed between said canopy and said body except for said receiving means;
   first locking means for locking said frame to said body and to retain said canopy in its closed position;
   first mechanical actuating means for causing release of said first locking means to unlock said frame from said body;
   second mechanical actuating means for causing pivoting of said body relative to said wheel means after said first mechanical actuating means has been effective to release said first locking means, said second mechanical actuating means being separate from said first mechanical actuating means;
   support means for supporting said second mechanical actuating means on said body;
   said second mechanical actuating means including releasably engaging means for releasably engaging said pull connecting means to prevent pivoting of said body relative to said wheel means until said second mechanical actuating means is actuated;
   said pull connecting means including body support means for supporting said body, without engaging said second mechanical actuating means, when said releasably engaging means of said second mechanical actuating means releasably engages said pull connecting means and after said releasably engaging means of said second mechanical actuating means is disengaged from said pull connecting means;
   said body mounting means being supported by said body support means;
   causing means cooperating with said frame for causing pivoting of said frame about said frame pivotal mounting means relative to said body in response to pivoting of said body relative to said wheel means by said second mechanical actuating means;
   and each of said first mechanical actuating means and said second mechanical actuating means being accessible from the front of said collector cart and being movable separately.

2. The collector cart according to claim 1 in which:
   said body support means of said pull connecting means engages said bottom wall of said body to support said body when said releasably engaging means of said second mechanical actuating means is releasably engaging said pull connecting means;
   and said body support means of said pull connecting means has said wheel means secured thereto.

3. The collector cart according to claim 2 in which said frame pivotal mounting means includes:
   a rod attached to said frame of said canopy;
   one of said side walls of said body having an opening to receive one end of said rod;
   the other of said side walls of said body having an upwardly facing slot to receive the other end of said rod;
   and retaining means supported by said body to retain the other end of said rod in said upwardly facing slot of said body.

4. The collector cart according to claim 1 including aiding means for at least aiding pivoting of said body when said second mechanical actuating means is actuated to disengage said releasably engaging means from said pull connecting means, said aiding means being separate from said second mechanical actuating means, and said aiding means retaining said canopy in its dumping position.

5. The collector cart according to claim 4 in which said aiding means includes:

a first member secured to said pull connecting means;
a second member secured to said body;
and one of said first member and said second member being telescopically received within the other of said first member and said second member and subjected to the pressure of a gas therebetween to aid in pivoting of said body and retaining said canopy in its dumping position.

6. The collector cart according to claim 1 in which said frame pivotal mounting means includes:
a rod attached to said frame of said canopy;
one of said side walls of said body having an opening to receive one end of said rod;
the other of said side walls of said body having an upwardly facing slot to receive the other end of said rod;
and retaining means supported by said body to retain the other end of said rod in said upwardly facing slot of said body.

7. The collector cart according to claim 6 in which said retaining means includes a resiliently biased element secured to said body exterior of said upwardly facing slot and having an opening to receive the other end of said rod received in said upwardly facing slot of said body.

8. The collector cart according to claim 1 in which said body mounting means includes:
first means supported solely by said body support means of said pull connecting means;
second means supported by said body;
and cooperating means cooperating with said first means and said second means for pivotally connecting said first means and said second means to each other to pivotally connect said body to said pull connecting means.

9. The collector cart according to claim 1 in which said first mechanical actuating means includes adjusting means for adjusting the tension of said cover of said canopy.

10. The collector cart according to claim 1 including resilient means for continuously urging said second mechanical actuating means to a position in which said releasably engaging means engages said pull connecting means.

11. The collector cart according to claim 1 including second locking means for locking said second mechanical actuating means to said pull connecting means when said releasably engaging means of said second mechanical actuating means is releasably engaging said pull connecting means.

12. The collector cart according to claim 1 including said body mounting means and said body support means having cooperating means for pivotally connecting said body mounting means to said body support means for pivotally mounting said body for pivotal movement relative to said wheel means and said pull connecting means.

13. A collector cart for towing by pulling means including:
a body having a bottom wall, side walls, a front wall, and an open rear end;
pull connecting means extending forwardly of said body for connection to the pulling means;
wheel means supporting said pull connecting means;
body mounting means for mounting said body for pivotal movement relative to said wheel means and said pull connecting means;
a canopy including:
a frame;
and a cover mounted on said frame;
frame pivotal mounting means for mounting said frame on top of said body solely for pivotal movement of said canopy between a closed position and a dumping position, said frame pivotal mounting means being disposed adjacent the front of each of said frame and said body;
said frame including closing means for closing said open rear end of said body when said canopy is in its closed position;
said cover of said canopy having receiving means for receiving debris into the interior of said cover of said canopy and the interior of said body when said canopy is in its closed position when mounted on top of said body in which an enclosed chamber is formed between said canopy and said body except for said receiving means;
locking means for locking said frame to said body and to retain said canopy in its closed position;
first mechanical actuating means for causing release of said locking means to unlock said frame from said body;
second mechanical actuating means for causing pivoting of said body relative to said wheel means after said first mechanical actuating means has been effective to release said locking means, said second mechanical actuating means being separate from said first mechanical actuating means;
support means for supporting said second mechanical actuating means on said body;
said second mechanical actuating means including releasably engaging means for releasably engaging said pull connecting means to prevent pivoting of said body relative to said wheel means until said second mechanical actuating means is actuated;
said pull connecting means including body support means for supporting said body when said releasably engaging means of said second mechanical actuating means releasably engages said pull connecting means;
causing means cooperating with said frame for causing pivoting of said frame about said frame pivotal mounting means relative to said body in response to pivoting of said body relative to said wheel means by said second mechanical actuating means;
and each of said first mechanical actuating means and said second mechanical actuating means being accessible from the front of said collector cart and being movable separately;
said pull connecting means including attaching means at its forward end for attachment to a structure on the pulling means;
and said attaching means including:
first mounting means connected to said pull connecting means at its forward end;
second mounting means adjustably positioned on said first mounting means in accordance with a structure on the pulling means to which said pull connecting means is to be attached;
and said second mounting means including releasably connecting means for releasably connecting said second mounting means to two separate elements of the structure on the pulling means.

14. The collector cart according to claim 13 in which said second mounting means includes:
a pair of substantially parallel legs connected to each other and to said first mounting means;

each of said pair of legs having releasably engaging means on its end distal from said first mounting means for releasably engaging one of the two separate elements of the structure on the pulling means;
a first locking bar pivotally mounted on one of said pair of legs;
a second locking bar pivotally mounted on the other of said pair of legs;
locking bar connecting means for connecting said first locking bar and said second locking bar to each other;
and resilient means continuously urging said first locking bar and said second locking bar to a retaining position to retain said releasably engaging means of each of said pair of legs in a position in which said releasably engaging means of each of said pair of legs is releasably engaging one of the two separate elements of the structure on the pulling means.

15. A collector cart for towing by pulling means including:
a body having a bottom wall, side walls, a front wall, and an open rear end;
pull connecting means extending forwardly of said body for connection to the pulling means;
wheel means supporting said pull connecting means;
body mounting means for mounting said body for pivotal movement relative to said wheel means and said pull connecting means;
a canopy including:
a frame;
and a cover mounted on said frame;
frame pivotal mounting means for mounting said frame on top of said body solely for pivotal movement of said canopy between a closed position and a dumping position, said frame pivotal mounting means being disposed adjacent the front of each of said frame and said body;
said frame including closing means for closing said open rear end of said body when said canopy is in its closed position;
said cover of said canopy having receiving means for receiving debris into the interior of said cover of said canopy and the interior of said body when said canopy is in its closed position when mounted on top of said body in which an enclosed chamber is formed between said canopy and said body except for said receiving means;
said frame including;
a front frame support pivotally mounted on said body by said frame pivotal mounting means;
a rear frame support supporting said closing means;
and rear frame support pivotal mounting means for pivotally mounting said rear frame support;
locking means for locking said rear frame support to said body to lock said frame to said body and to retain said canopy in its closed position, said locking means being supported by said rear frame support;
first mechanical actuating means for causing release of said locking means to unlock said frame from said body;
said first mechanical actuating means including:
attached means attached to said rear frame support;
means connected to said front frame support and to said attached means for causing pivoting of said rear frame support relative to said rear frame support pivotal mounting means of said frame to release said locking means to unlock said frame from said body;
and means for changing the effective length of said attached means to change the tension of said cover of said canopy;
second mechanical actuating means for causing pivoting of said body relative to said wheel means after said first mechanical actuating means has been effective to release said locking means, said second mechanical actuating means being separate from said first mechanical actuating means;
support means for supporting said second mechanical actuating means on said body;
said second mechanical actuating means including releasably engaging means for releasably engaging said pull connecting means to prevent pivoting of said body relative to said wheel means until said second mechanical actuating means is actuated;
said pull connecting means including body support means for supporting said body when said releasably engaging means of said second mechanical actuating means releasably engages said pull connecting means;
causing means cooperating with said frame for causing pivoting of said frame about said frame pivotal mounting means relative to said body in response to pivoting of said body relative to said wheel means by said second mechanical actuating means;
and each of said first mechanical actuating means and said second mechanical actuating means being accessible from the front of said collector cart and being movable separately.

16. The collector cart according to claim 15 in which:
said body support means of said pull connecting means engages said bottom wall of said body to support said body when said releasably engaging means of said second mechanical actuating means is releasably engaging said pull connecting means;
and said body support means of said pull connecting means has said wheel means connected thereto.

17. The collector cart according to claim 16 including:
said pull connecting means including attaching means at its forward end for attachment to a structure on the pulling means;
and said attaching means including:
first mounting means connected to said pull connecting means at its forward end;
second mounting means adjustably positioned on said first mounting means in accordance with a structure on the pulling means to which said pull connecting means is to be attached;
and said second mounting means including releasably connecting means for releasably connecting said second mounting means to two separate elements of the structure on the pulling means.

18. The collector cart according to claim 17 in which said second mounting means includes:
a pair of substantially parallel legs connected to each other and to said first mounting means;
each of said pair of legs having releasably engaging means on its end distal from said first mounting means for releasably engaging one of the two separate elements of the structure on the pulling means;
a first locking bar pivotally mounted on one of said pair of legs;
a second locking bar pivotally mounted on the other of said pair of legs;

locking bar connecting means for connecting said first locking bar and said second locking bar to each other;

and resilient means continuously urging said first locking bar and said second locking bar to a retaining position to retain said releasably engaging means of each of said pair of legs in a position in which said releasably engaging means of each of said pair of legs is releasably engaging one of the two separate elements of the structure on the pulling means.

19. The collector cart according to claim 18 in which said frame pivotal mounting means includes:

a rod attached to said frame of said canopy;

one of said side walls of said body having an opening to receive one end of said rod;

the other of said side walls of said body having an upwardly facing slot to receive the other end of said rod;

and retaining means supported by said body to retain the other end of said rod in said upwardly facing slot of said body.

20. The collector cart according to claim 19 in which said retaining means includes a resiliently biased element secured to said body exterior of said upwardly facing slot and having an opening to receive the other end of said rod received in said upwardly facing slot of said body.

21. A collector cart for towing by pulling means including:

a body having a bottom wall, side walls, a front wall, and an open rear end;

pull connecting means extending forwardly of said body for connecting to the pulling means;

wheel means supporting said pull connecting means;

body mounting means for mounting said body for pivotal movement relative to said wheel means and said pull connecting means;

a canopy including: a frame; and a cover mounted on said frame;

frame pivotal mounting means for mounting said frame on top of said body solely for pivotal movement of said canopy between a closed position and a dumping position, said frame pivotal mounting means being disposed adjacent the front of each of said frame and said body;

said frame including closing means for closing said open rear end of said body when said canopy is in its closed position when mounted on top of said body;

said cover of said canopy having receiving means for receiving debris into the interior of said cover of said canopy and the interior of said body when said canopy is in its closed position when mounted on top of said body in which an enclosed chamber is formed between said canopy and said body except for said receiving means;

locking means for locking said frame to said body and to retain said canopy in its closed position;

first pivotally mounted means for causing release of said locking means to unlock said frame from said body;

second pivotally mounted means for causing pivoting of said body relative to said wheel means after said first pivotally mounted means has been effective to release said locking means, said second pivotally mounted means being separate from said first pivotally mounted means;

mounting means for pivotally mounting said second pivotally mounted means on said body;

said second pivotally mounted means including releasably engaging means for releasably engaging said pull connecting means to prevent pivoting of said body relative to said wheel means until said second pivotally mounted means is actuated;

said pull connecting means including body support means for supporting said body, without engaging said second pivotally mounted means, when said releasably engaging means of said second pivotally mounted means releasably engages said pull connecting means and after said releasably engaging means of said second pivotally mounted means is releasably disengaged from said pull connecting means;

causing means cooperating with said frame for causing pivoting of said frame about said frame pivotal mounting means relative to said body in response to pivoting of said body relative to said wheel means by said second pivotally mounted means;

and each of said first pivotally mounted means and said second pivotally mounted means being accessible from the front of said collector cart and being movable separately.

* * * * *

UNITED STATES PATENT AND TRADEMARK OFFICE
CERTIFICATE OF CORRECTION

PATENT NO. : 5,249,842
DATED     : October 5, 1993
INVENTOR(S) : Charles W. Doering et al It is certified that error appears in the above-identified patent and that said Letters Patent is hereby corrected as shown below:

Column 5, line 6, "atop" should read --- a top --- .

Column 21, lines 41 and 42 should read:

--- a canopy including:

a frame;

and a cover mounted on said frame;---.

Signed and Sealed this

Twelfth Day of April, 1994

Attest:

BRUCE LEHMAN

Attesting Officer      Commissioner of Patents and Trademarks